(12) United States Patent
Nakayama et al.

(10) Patent No.: US 12,348,092 B2
(45) Date of Patent: Jul. 1, 2025

(54) METHOD FOR MANUFACTURING COIL

(71) Applicant: AISIN CORPORATION, Aichi (JP)

(72) Inventors: Suguru Nakayama, Kariya (JP);
Shunsuke Koyabu, Kariya (JP);
Takahisa Kanie, Kariya (JP); Akinori Hoshino, Kariya (JP)

(73) Assignee: AISIN CORPORATION, Kariya (JP)

( * ) Notice: Subject to any disclaimer, the term of this patent is extended or adjusted under 35 U.S.C. 154(b) by 29 days.

(21) Appl. No.: 18/030,804

(22) PCT Filed: Oct. 6, 2021

(86) PCT No.: PCT/JP2021/037050
§ 371 (c)(1),
(2) Date: Apr. 7, 2023

(87) PCT Pub. No.: WO2022/075378
PCT Pub. Date: Apr. 14, 2022

(65) Prior Publication Data
US 2023/0378857 A1 Nov. 23, 2023

(30) Foreign Application Priority Data
Oct. 7, 2020 (JP) .................. 2020-170049

(51) Int. Cl.
*C23C 22/00* (2006.01)
*H02K 15/0421* (2025.01)
*H02K 15/12* (2006.01)

(52) U.S. Cl.
CPC ......... *H02K 15/12* (2013.01); *H02K 15/0421* (2013.01); *H02K 2215/00* (2021.08)

(58) Field of Classification Search
CPC ..................................... C23C 22/00
See application file for complete search history.

(56) References Cited

U.S. PATENT DOCUMENTS 4,615,778 A   10/1986   Elton

FOREIGN PATENT DOCUMENTS

| JP | H11-152599 A | 6/1999 |
| JP | 2012-167349 A | 9/2012 |
| JP | 2012-224924 A | 11/2012 |

(Continued)

OTHER PUBLICATIONS

JP2012224924, English translation, (Year: 2012).*

(Continued)

*Primary Examiner* — Kelly M Gambetta
*Assistant Examiner* — Mohammad Mayy
(74) *Attorney, Agent, or Firm* — Oliff PLC

(57) ABSTRACT

A method for manufacturing a coil with an insulating film 130 is provided that includes: a preparation step of preparing a formed workpiece W to which the insulating film has not yet been applied; and an electrodeposition coating step of generating, with the workpiece W immersed in an electrodeposition bath, a potential difference between a first electrode connected to the workpiece W and a second electrode in the electrodeposition bath. In the electrodeposition coating step, the insulating film is simultaneously applied to a portion of the workpiece W and another portion of the workpiece W in such a manner that a film thickness on the portion is thicker than a film thickness on the other portion.

16 Claims, 20 Drawing Sheets

(56) References Cited

FOREIGN PATENT DOCUMENTS

| | | | |
|---|---|---|---|
| JP | 2012224924 | * | 11/2012 |
| JP | 2012167349 | * | 1/2015 |
| JP | 2017-115240 A | | 6/2017 |

OTHER PUBLICATIONS

JP2012167349, English translation, (Year: 2012).*
Feb. 9, 2024 Search Report issued in European Patent Application No. 21877677.1.
Dec. 28, 2021 International Search Report issued in International Patent Application No. PCT/JP2021/037050.

* cited by examiner

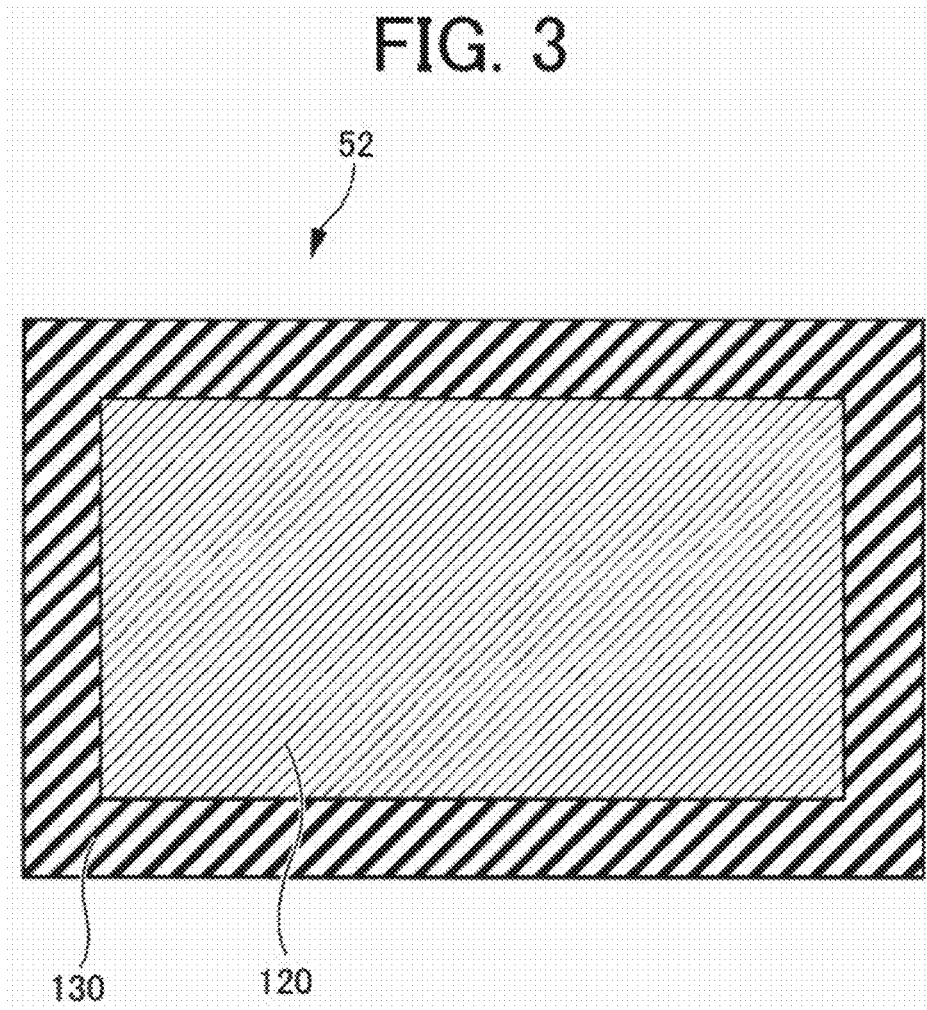

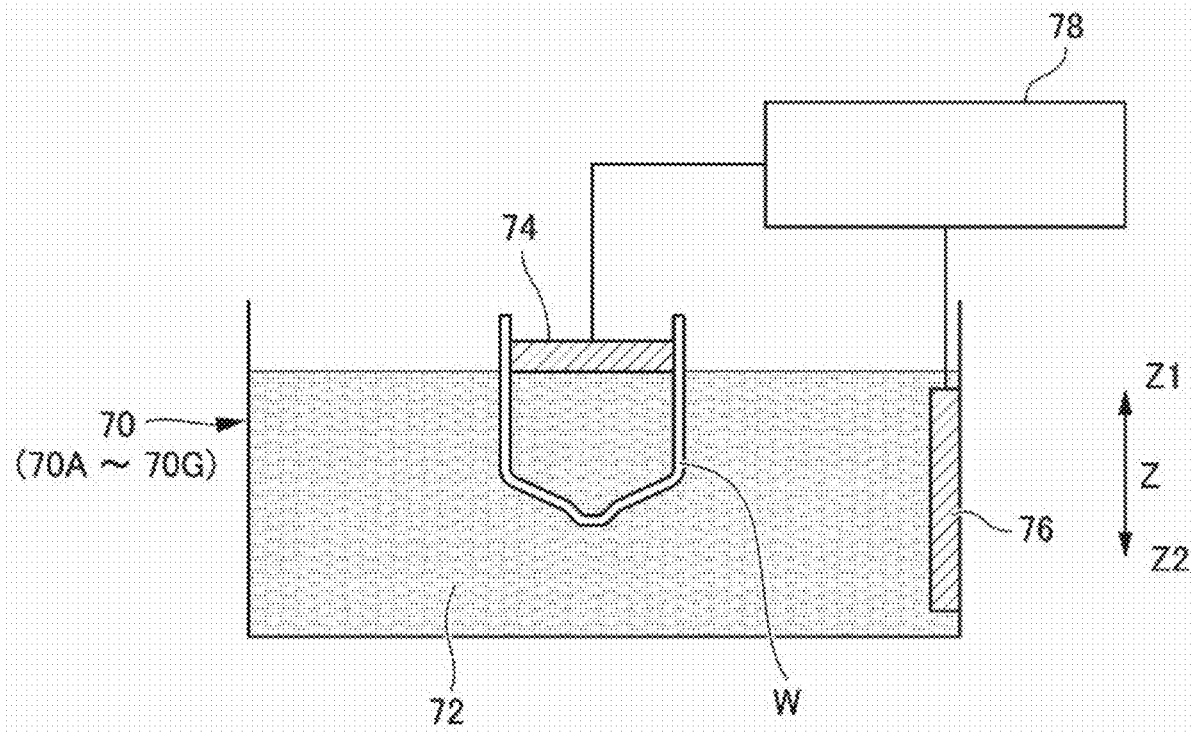

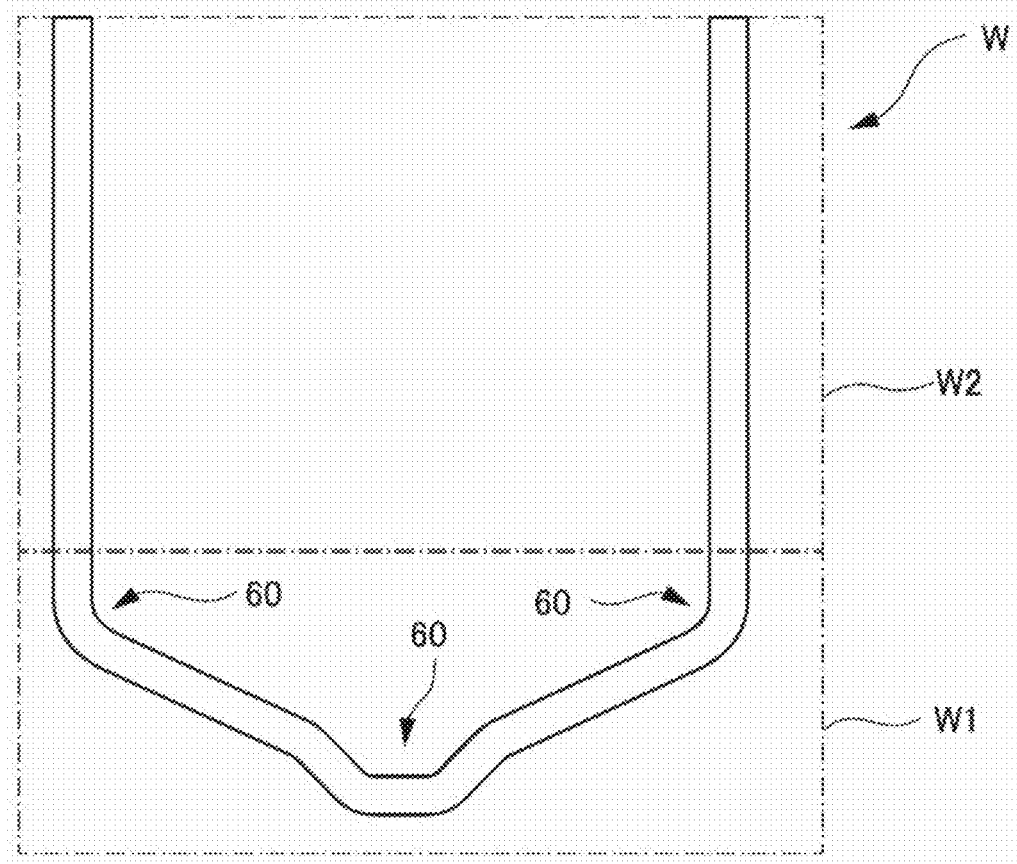

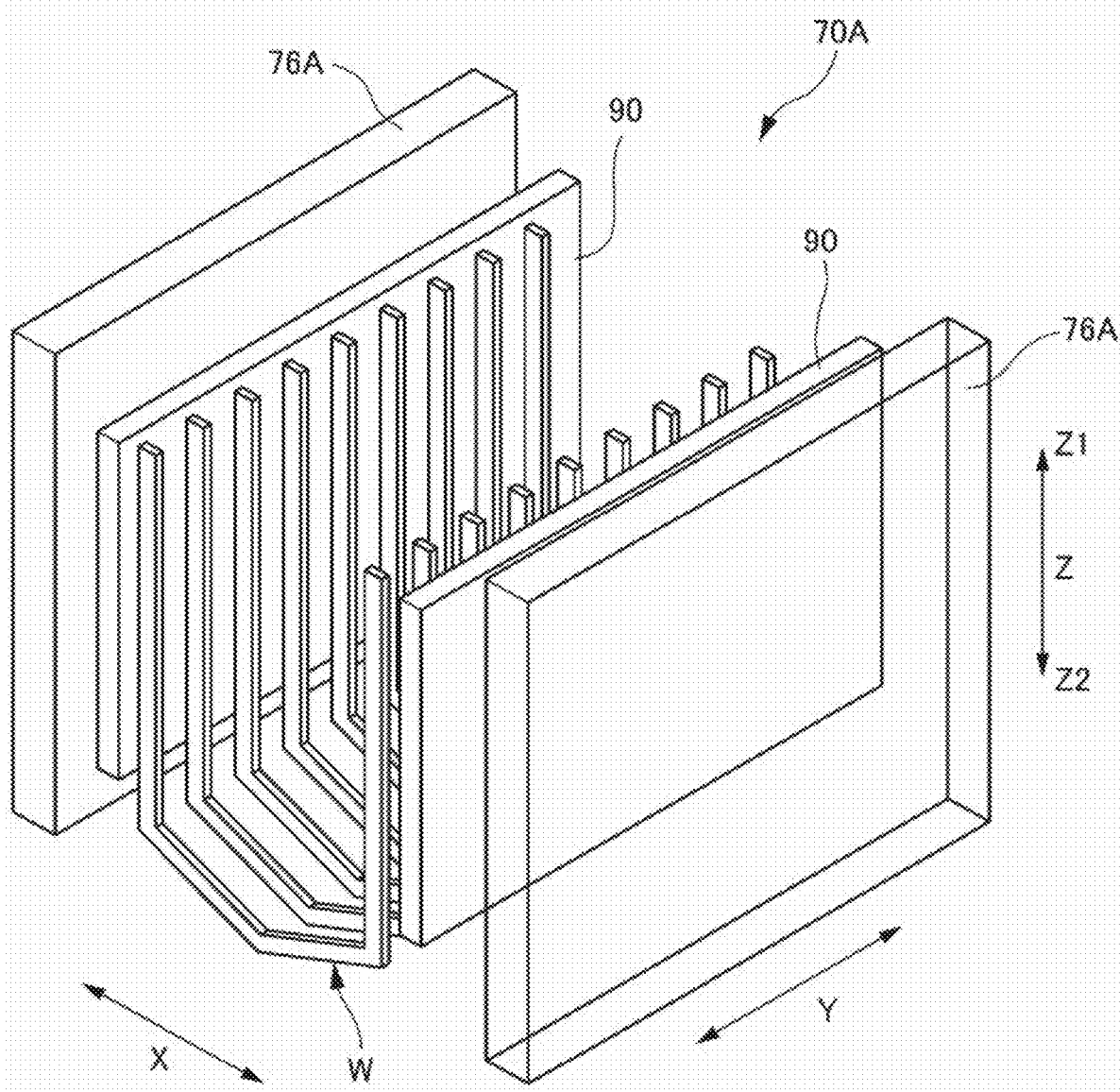

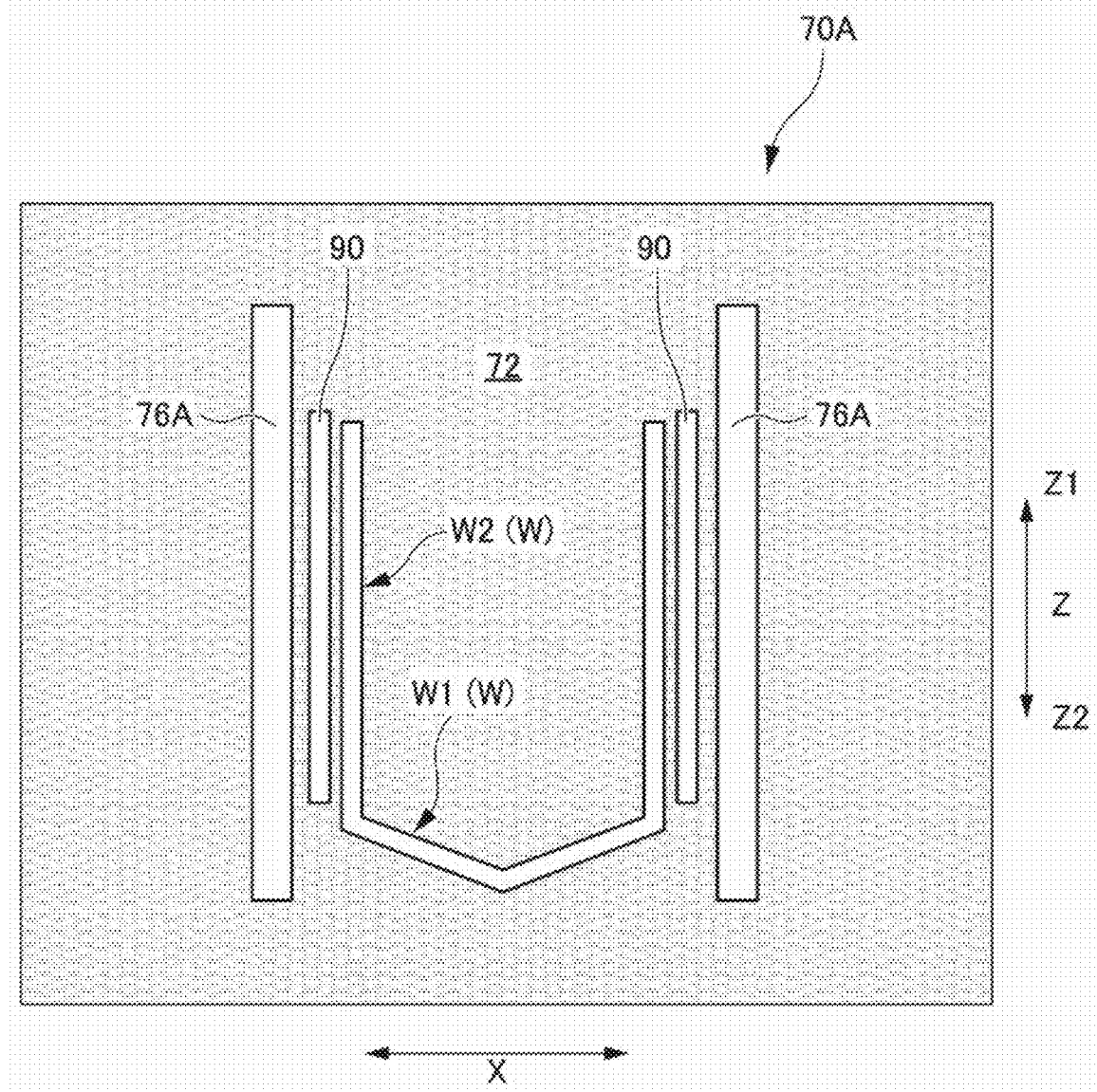

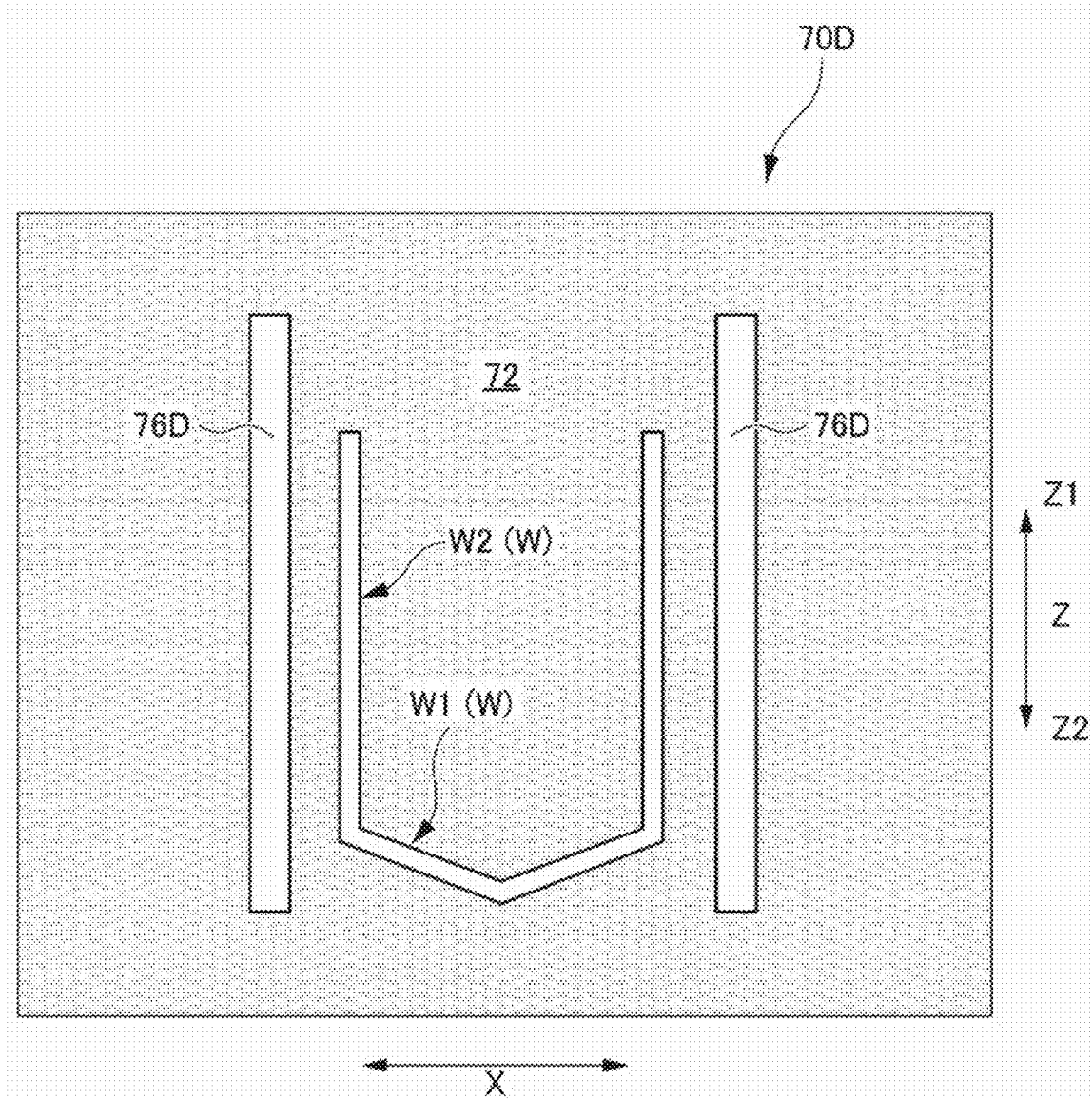

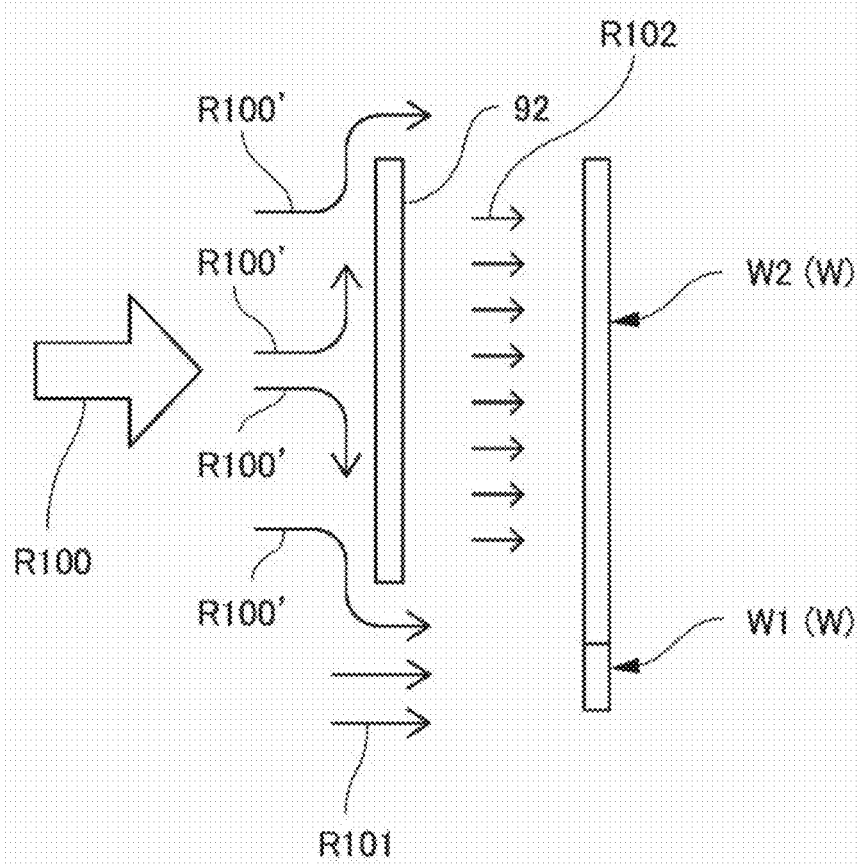

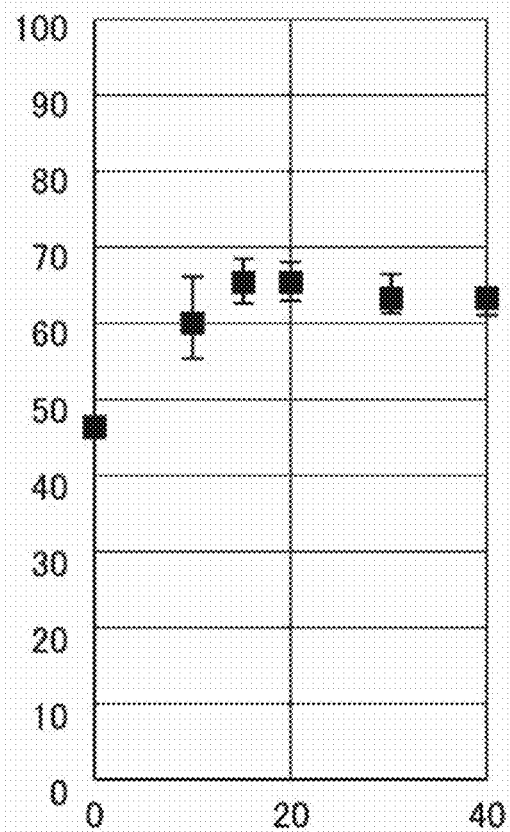

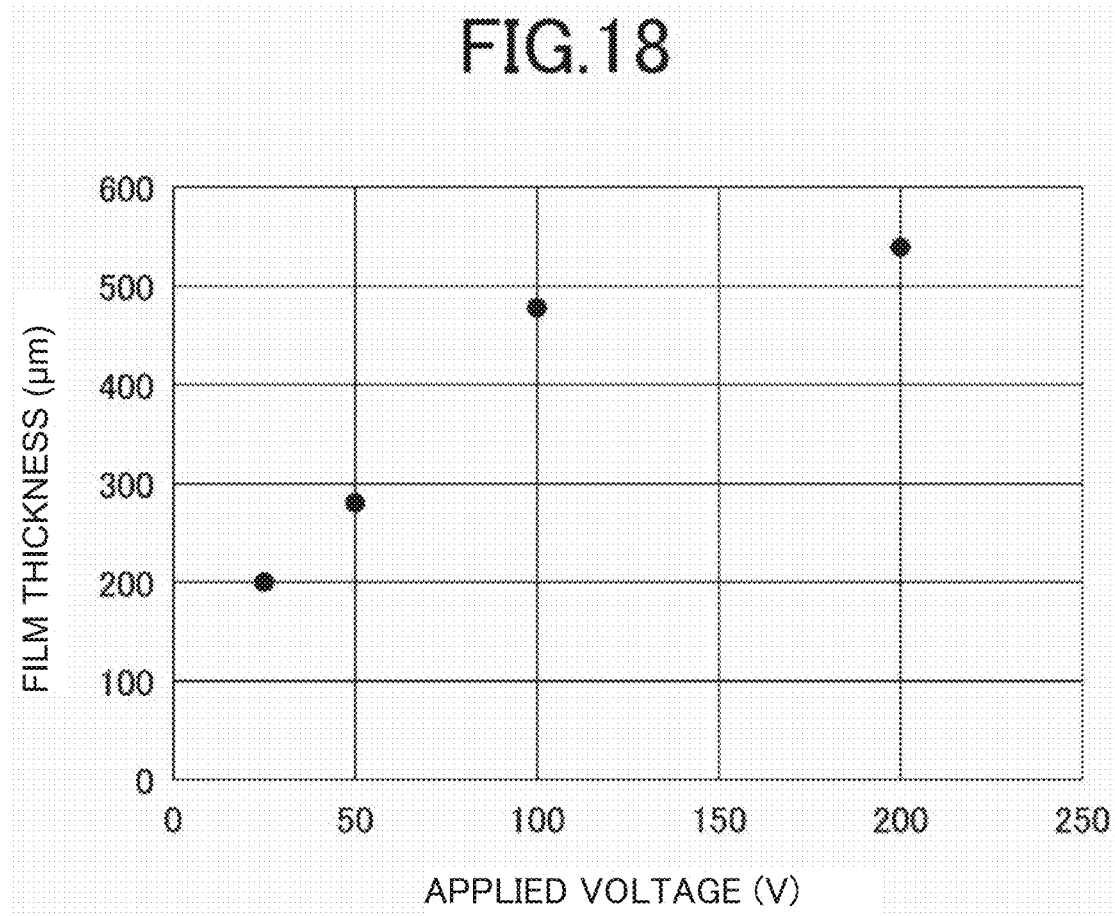

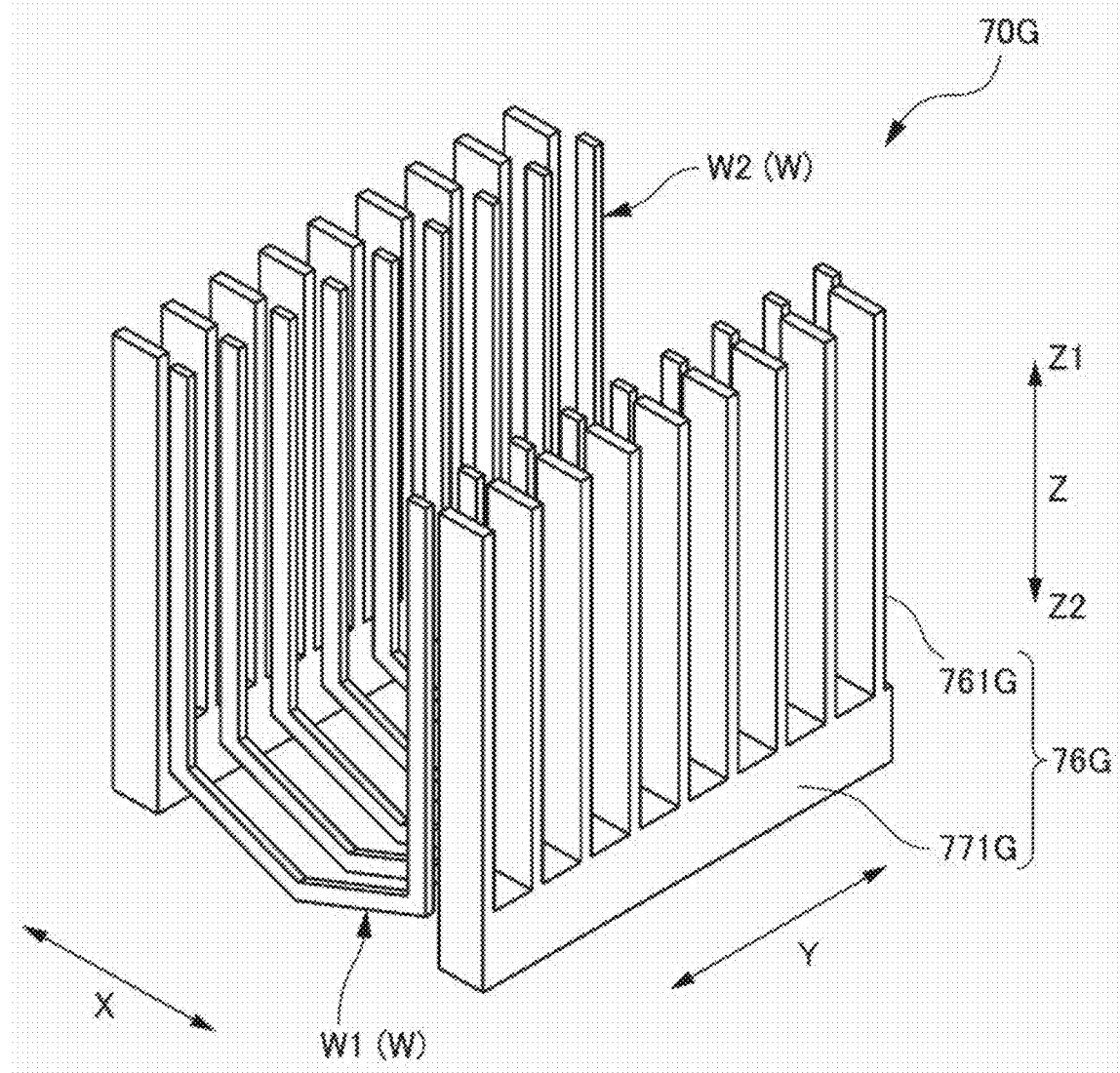

METHOD FOR MANUFACTURING COIL

TECHNICAL FIELD

The present disclosure relates to methods for manufacturing a coil.

BACKGROUND ART

A technique of applying an insulating film for a coil by electrodeposition coating is known in the art.

RELATED ART DOCUMENTS

Patent Documents

Patent Document 1: Japanese Unexamined Patent Application Publication No. 2017-115240 (JP 2017-115240 A)

SUMMARY OF THE DISCLOSURE

Problem to be Solved by the Invention

However, in the related art described above, it is difficult to efficiently apply an insulating film whose thickness is significantly different depending on the part of the coil by electrodeposition coating.

Accordingly, in one aspect, it is an object of the present disclosure to efficiently apply an insulating film whose thickness is significantly different depending on the part of a coil by electrodeposition coating.

Means for Solving the Problem

In one aspect, a method for manufacturing a coil with an insulating film is provided. The method for manufacturing a coil includes:
a preparation step of preparing a formed coil material to which the insulating film has not yet been applied; and an electrodeposition coating step of generating, with the coil material immersed in an electrodeposition bath, a potential difference between a first electrode connected to the coil material and a second electrode in the electrodeposition bath.

In the electrodeposition coating step, the insulating film is simultaneously applied to a portion of the coil material and another portion of the coil material in such a manner that a film thickness on the portion is thicker than a film thickness on the other portion.

Effects of the Invention

According to the present disclosure, the insulating film whose thickness is significantly different depending on the part of the coil can be efficiently applied by electrodeposition coating.

BRIEF DESCRIPTION OF THE DRAWINGS

FIG. 3 is a schematic sectional view of the coil piece.
FIG. 4A is an illustration of an electrodeposition coating step.
FIG. 4B is a schematic plan view showing one workpiece,
FIG. 5 is a perspective view illustrating a method for manufacturing a coil according to a first embodiment.
FIG. 6 is a front view illustrating the method for manufacturing a coil according to the first embodiment.
FIG. 10 is a front view illustrating the method for manufacturing a coil according to the third embodiment.
FIG. 11A is an illustration of the action of a flow velocity reducing member (action on the flow of paint).
FIG. 11B is a diagram showing the relationship between the flow velocity of paint and the film thickness.
FIG. 18 is a diagram showing the relationship between the applied voltage and the film thickness.
FIG. 19 is a perspective view illustrating a method for manufacturing a coil according to a sixth embodiment.

MODES FOR CARRYING OUT THE DISCLOSURE

Figure 1:
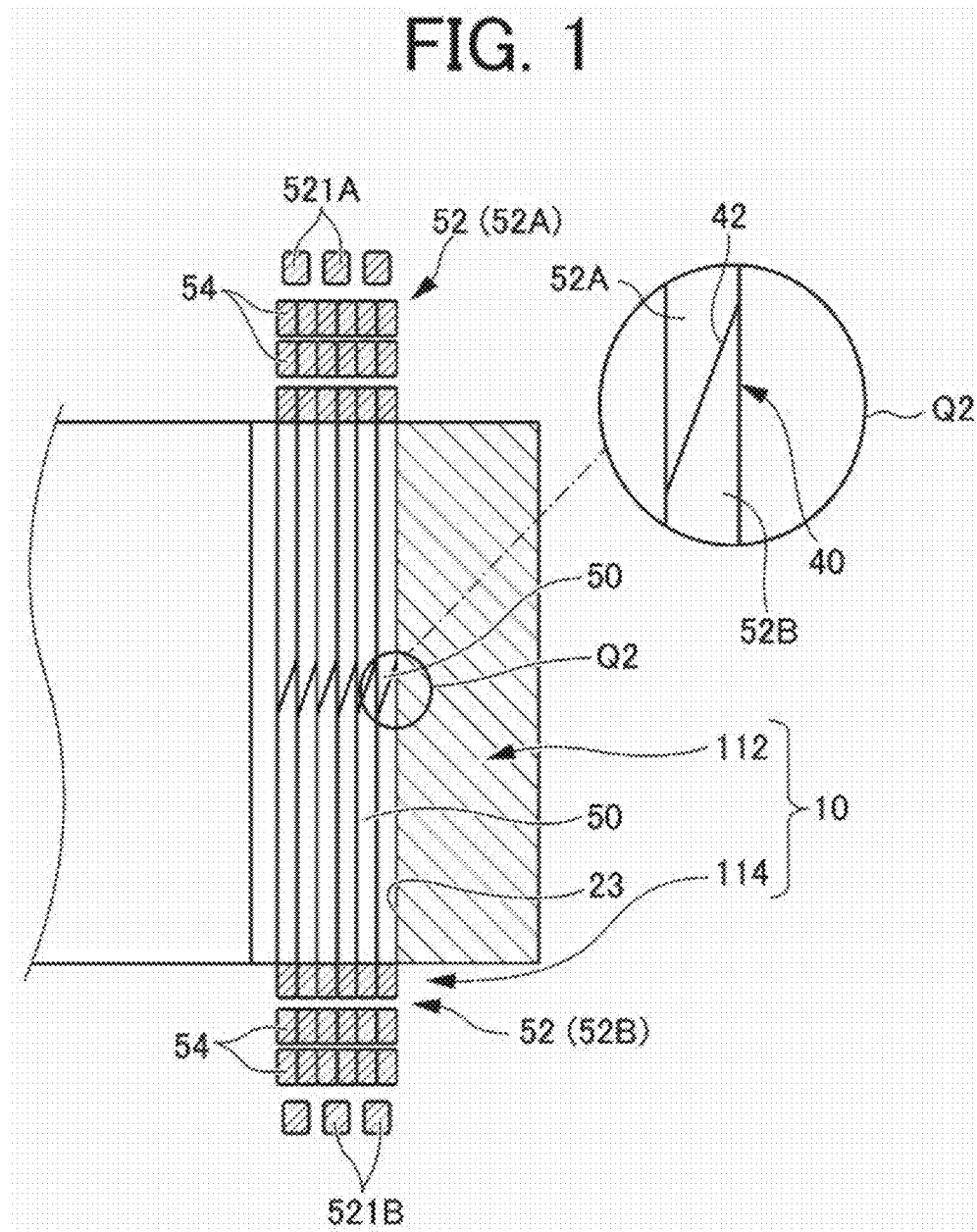
FIG. 1 is a sectional view of a stator taken along the axial direction.

Embodiments will be described in detail below with reference to the accompanying drawings. The dimensional ratios in the drawings are merely illustrative, and are not limited to these. The shapes etc. in the drawings may be partially exaggerated for convenience of description.

Hereinafter, a coil that is manufactured by a method for manufacturing a coil according to the present embodiment will first be outlined, and then the method for manufacturing a coil will be described.

Figure 2:
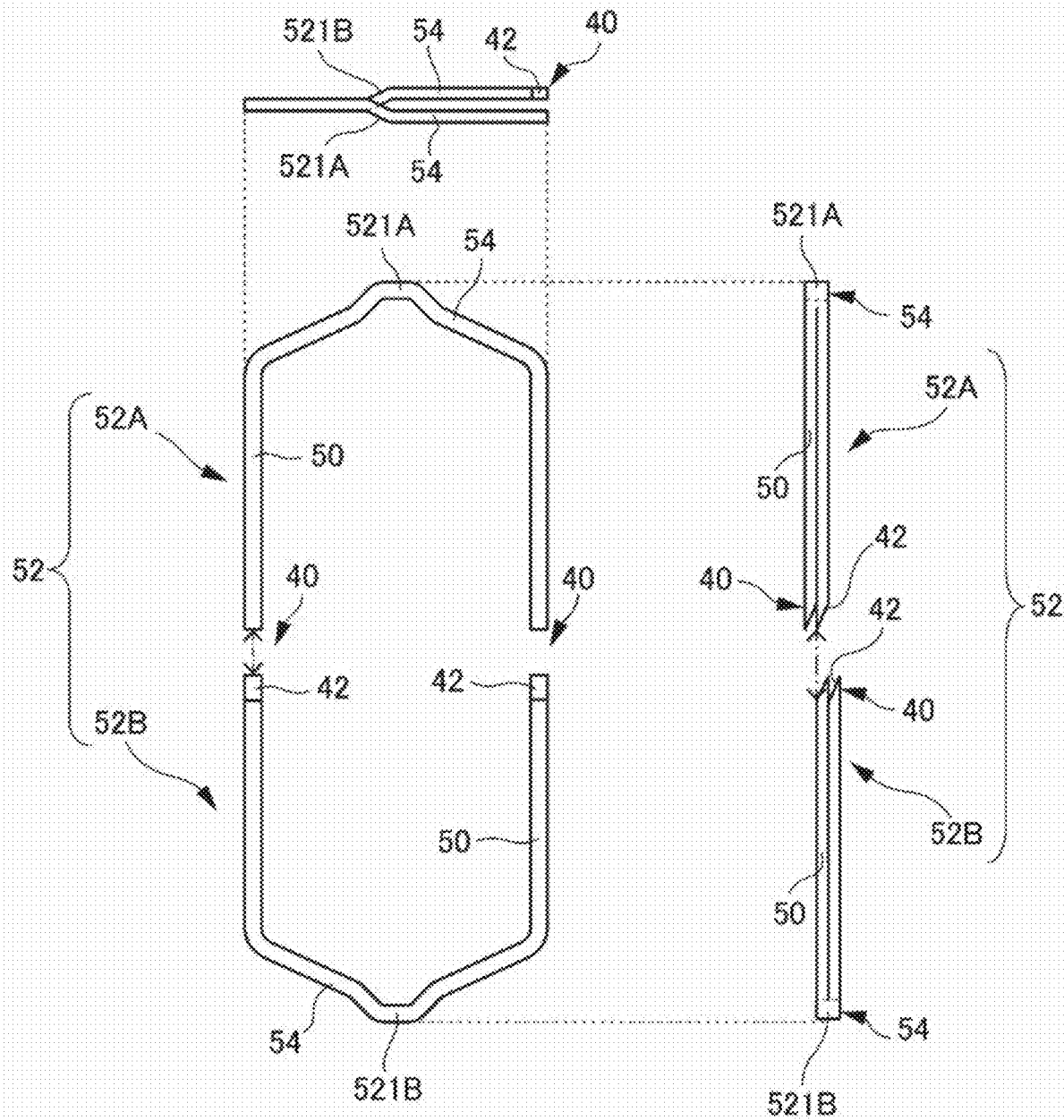
FIG. 2 shows a single coil piece as viewed from three directions.

FIG. 1 is a sectional view of a stator 10 with coil pieces 52 mounted in a stator core 112, taken along the axial direction. FIG. 1 also shows an enlarged view of a portion Q2 in the figure. FIG. 2 shows one coil piece 52 out of the plurality of coil pieces 52 as viewed from three directions. FIG. 3 is a schematic sectional view of the coil piece 52.

A stator coil 114 includes a U-phase coil, a V-phase coil, and a W-phase coil (hereinafter referred to as "phase coils" when the phases U, V, and W are not distinguished from each other). The proximal end of each phase coil is connected to an input terminal (not illustrated). The distal end of each phase coil is connected to the distal ends of the other phase coils to form a neutral point. That is, the stator coil 114 is connected in a star connection. However, the manner of connection of the stator coil 114 may be changed as appropriate according to the required motor characteristics etc. For example, the stator coil 114 may be connected in a delta connection instead of the star connection.

Each phase coil of the stator coil 114 is formed by joining a plurality of coil pieces 52. The coil pieces 52 are in the form of segment coils (segment conductors) obtained by dividing the phase coils into units that are easy to mount (e.g. units each to be inserted into two slots 23). As shown in FIG. 3, the coil piece 52 is formed by coating a linear conductor (rectangular wire) 120 having a generally rectangular cross section with an insulating film 130. As an example, the linear conductor is made of copper. In a modification, the linear conductor may be made of a different conductor material such as iron. The cross-sectional shape of the linear conductor fray be other than a rectangle.

One coil piece 52 is formed by joining a segment conductor 52A on one side in the axial direction and a segment conductor 52B on the other side in the axial direction.

Each of the segment conductor 52A and the segment conductor 52B may be formed in a generally U-shape that has a pair of straight slot-housed portions 50 and a crossover portion 54 connecting the pair of slot-housed portions 50. When mounting the coil piece 52 on the stator core 112, the pair of slot-housed portions 50 is inserted into the slots 23 (see FIG. 1). In this case, the coil piece 52 can be mounted in, for example, the axial direction.

A plurality of slot-housed portions 50 of the coil pieces 52 shown in FIG. 1 is inserted into one slot 23 side by side in the radial direction. A plurality of crossover portions 54 extending in the circumferential direction is thus located side by side in the radial direction at both ends in the axial direction of the stator core 112. As an example, six coil pieces 52 are herein mounted in one slot 23 (i.e. a six-layer winding structure). The crossover portions 54 form coil ends.

In the example shown in FIG. 2, one of the slot-housed portions 50 on both sides in the circumferential direction of the segment conductor 52A and one of the slot-housed portions 50 on both sides in the circumferential direction of the segment conductor 52B can be joined together, but the other slot-housed portion 50 of the segment conductor 52A and the other slot-housed portion 50 of the segment conductor 52B are offset in directions away from each other by one layer in the radial direction. Specifically, the segment conductor 52A and the segment conductor 52B include offset portions 521A, 521B at the top portions of opposing surfaces 42, and the offset portions 521A, 521B implement the offset in the opposite radial directions.

The coil pieces 52 are mounted in the stator core 112 by lap winding. In this case, as shown in FIG. 2, of the segment conductor 52A and the segment conductor 52B that form one coil piece 52, a joint portion 40 of the slot-housed portion 50 on one of both sides in the circumferential direction of the segment conductor 52A and a joint portion 40 of the slot-housed portion 50 on the one of both sides in the circumferential direction of the segment conductor 52B are joined together. In this case, the slot-housed portion 50 on the other side is coupled to another coil piece 52. The joint portions 40 have opposing surfaces 42 that entirely face each other in the radial direction and that make surface contact with each other, and the joint portions 40 are joined together with the opposing surfaces 42 placed on top of each other.

Although the stator core 112 and the stator coil 114 that have a specific structure are shown in FIGS. 1 to 3, the stator core 112 and the stator coil 114 may have any structure as long as the stator coil 114 has the insulating film 130. The coil pieces in the form of segment coils are not limited to the form in which the coil pieces are joined together in the slots 23 of the stator core 112 like the coil pieces 52, and may be in other forms such as a form in which the coil pieces are joined together at one end in the axial direction. The stator coil 114 may also be wound in any manner, and may be wound in a manner other than the lap winding mentioned above, such as wave winding.

Next, the method for manufacturing a coil according to the present embodiment will be described in detail with reference to FIG. 4A and the subsequent figures.

The method for manufacturing a coil according to the present embodiment first includes a preparation step of preparing a formed coil material to which the insulating film 130 has not yet been applied. The formed coil material is obtained by, for example, bending a straight linear conductor. The formed coil material may be a coil material that has been subjected to only a part of forming, or may be a coil material that has been completely formed into a form corresponding to, for example, the segment conductors 52A, 52B of the coil piece 52 shown in FIG. 2 (see FIG. 4B).

The method for manufacturing a coil according to the present embodiment includes an electrodeposition coating step of applying the insulating film 130 to the coil material prepared in the preparation step (hereinafter also referred to as "workpiece W") by electrodeposition coating. Other step(s) may be included between the preparation step and the electrodeposition coating step.

A target portion of the workpiece W to which the insulating film 130 is to be applied (portion to be coated) may be the entire workpiece W or a part of the workpiece W. In the present embodiment, as an example, the target portion of the workpiece W to which the insulating film 130 is to be applied is substantially the entire workpiece W, and is hereinafter simply referred to as workpiece W.

FIG. 4A is an illustration of the overview of the electrodeposition coating step. FIG. 4B is a schematic plan view showing one workpiece W.

In the electrodeposition coating step, the workpiece W is immersed in an electrodeposition bath 70 as shown in FIG. 4A. The electrodeposition bath 70 is filled with paint. In FIG. 4A, the paint filling the electrodeposition bath 70 is schematically shown by a shaded area 72. The paint is the material of the insulating film 130, and may be an insulating paint containing a polyamides-imide resin, a polyimide resin, etc.

When a potential difference is generated between a first electrode 74 and a second electrode 76, a direct current is generated via the paint (coating film component is electrophoresed), and a film of the paint (coating film) is deposited (electrodeposited) on the surface of the workpiece W immersed in the electrodeposition bath 70. The film of the paint formed in this way serves as the insulating film 130. The first electrode 74 is directly electrically connected to the workpiece W, the second electrode 76 is placed in the electrodeposition bath 70, and a direct current power supply (rectifier) 78 is electrically connected between the first electrode 74 and the second electrode 76. The paint in the electrodeposition bath 70 has flow during the electrodeposition coating step. For example, during the electrodeposition coating step, the paint is supplied to the electrodeposition bath 70 from a pipe on the supply side (not shown) and is discharged from the discharge side. In this case, the paint is circulated through the electrodeposition bath 70.

Although the second electrode 76 is schematically shown in FIG. 4A, specific examples of various electrode configurations for the second electrode 76 that generates a potential difference with the first electrode 74 will be described later.

The insulating film 130 is applied to the workpiece W so that the workpiece W eventually forms a coil piece 52. It is desirable, from the standpoint of improving insulation between different phases, that the insulating film 130 of those portions of the coil piece 52 that form the coil ends as described above crossover portions 54) be relatively thick. It is also desirable, from the standpoint of increasing the occupancy rate of the conductors in each slot 23, that the insulating film 130 of the slot-housed portions 50 of the coil piece 52 that are to be housed in the slots 23 be relatively thin.

Therefore, the electrodeposition coating step according to the present embodiment is configured to simultaneously apply the insulating film 130 to a portion of the workpiece W that will serve as the crossover portion 54 (hereinafter referred to as "thick film application portion W1") and a portion of the workpiece \V that will serve as the slot-housed portions 50 (hereinafter referred to as "thin film application portion 11'2") by electrodeposition coating so that the film thickness on the thick film application portion W1 is significantly larger than that on the thin film application portion W2. In this case, when the film thickness on the thin film application portion W2 is 1.0, the film thickness on the thick film application portion W1 is 1.1 or more, preferably 2.0 (i.e., twice as large) or more. FIG. 4B shows an example of the thick film application portion W1 and the thin film application portion W2 of the workpiece W. The boundary position between the thick film application portion W1 and the thin film application portion W2 may be slightly shifted from the position shown in FIG. 4B.

Hereinafter, a part of the method for manufacturing a coil according to the present embodiment that relates to the electrodeposition coating step that causes the difference in thickness of the insulating film 130 between the thick film application portion W1 and the thin film application portion W2 will be described for a plurality of embodiments.

First Embodiment

FIGS. 5 and 6 are illustrations of a method for manufacturing a coil according to a first embodiment. FIG. 5 is a perspective view schematically showing the workpieces W immersed in an electrodeposition bath 70A, and FIG. 6 is a front view schematically showing the workpieces W immersed in the electrodeposition bath 70A. In FIGS. 5 and 6 (and also in the subsequent figures such as FIG. 7), the X, Y, and Z axes that are orthogonal to each other are defined, and the Z1 side and the Z2 side in the Z direction are defined for the Z axis. The Z direction corresponds to the vertical direction, and the Z1 side and the Z2 side correspond to the upper side and the lower side, respectively.

In FIGS. 5 and 6 (and also in the subsequent figures such as FIG. 7), the first electrode 74 and the direct current power supply 78 that are described above are not shown, but it is herein assumed the first electrode 74 and the direct current power supply 78 are similarly provided in the manner shown in FIG. 4A.

In the examples shown in FIGS. 5 and 6, a plurality of workpieces W is immersed at the same time. Specifically, as an example, the plurality of workpieces W is immersed side by side in the Y direction. Although a random one of the workpieces will be described below unless otherwise specified, the other workpieces W are substantially similar to this workpiece W. The same applies to second and subsequent embodiments that will be described later. FIGS. 5 and 6 show the workpieces W immersed in the electrodeposition bath 70A (workpieces W being subjected to electrodeposition coating). The same applies to the subsequent figures such as FIG. 7. In the perspective view shown in FIG. 5 (and also in the perspective views such as FIG. 7), a member on the side closer to the viewer of the figure is shown transparent for better understanding of the state of the workpieces W etc.

In the first embodiment, the second electrode 76 has electrodes 76A, and the electrodeposition bath 70A further has shielding members 90 whose electrical resistance is significantly higher than that of the electrodes 76A.

The electrodes 76A are disposed on both sides in the X direction of the workpieces W so as to face, in the X direction, the thin film application portions W2 for the slot-housed portions 50 on both sides in the X direction. Each electrode 76A is disposed so as to cover the workpieces W along their entire length in the Z direction as viewed in the X direction. In a modification, the electrodes 76A may be disposed on both sides in the Y direction of the workpieces W. In this case as well, each electrode 76A is disposed so as to cover the workpieces W along their entire length in the Z direction as viewed in the Y direction.

Each shielding member 90 is formed by, for example, coating a steel use stainless (SUS) plate etc. with epoxy resin etc. Each shielding member 90 is disposed so as to cover a part of each workpiece W, namely the thin film application portions W2 along their entire length in the Z direction, as viewed in the X direction. Therefore, the shielding members 90 do not cover the thick film application portions W1 as viewed in the X direction.

In this case, as shown in FIGS. 5 and 6, the electrodeposition coating step according to the first embodiment includes immersing the workpieces W in the electrodeposition bath 70A such that each shielding member 90 is located between the thin film application portions W2 and the electrode 76A. In other words, each shielding member 90 is mounted in the electrodeposition bath 70A such that it is located between the thin film application portions W2 and the electrode 76A in the X direction when the workpieces W are immersed in the electrodeposition bath 70A. The shielding members 90 may be immersed together with the workpieces W in the electrodeposition bath 70A, may be immersed in the electrodeposition bath 70A after the workpieces W are immersed therein, or may be set in advance in the electrodeposition bath 70A.

According to the electrodeposition coating step of the first embodiment, since each shielding member 90 is disposed between the thin film application portions W2 and the electrode 76A, the thickness of the insulating film 130 that is applied to the thin film application portions W2 can be reduced. Specifically, since each shielding member 90 is disposed between the electrode 76A and the thin film application portions W2, it is more difficult for electricity to flow (current density decreases) around the thin film application portions W2, so that a coating film is less likely to be deposited on the thin film application portions W2. On the other hand, since no shielding member 90 is located between the electrode 76A and the thick film application portions W1, electricity easily flows around the thick film application portions W1, and a coating film is easily deposited on the thick film application portions W1. As a result, a significantly thicker insulating film 130 can be applied to the thick film application portions W1 than to the thin film application portions W2.

As described above, according to the first embodiment, the shielding member 90 is used to make it more difficult for a coating film to be deposited locally on a part of each workpiece W, namely the thin film application portions W2. Therefore, the insulating film 130 can be simultaneously applied with different thicknesses to the thick film application portions W1 and the thin film application portions W2.

Therefore, according to the first embodiment, the difference in thickness of the insulating film 130 between the thick film application portion W1 and the thin film application portion W2 can be efficiently obtained. That is, according to the first embodiment, the insulating film 130 whose thickness is significantly different depending on the part of the coil piece 52 can be efficiently applied by electrodeposition coating.

Second Embodiment

Figure 7:
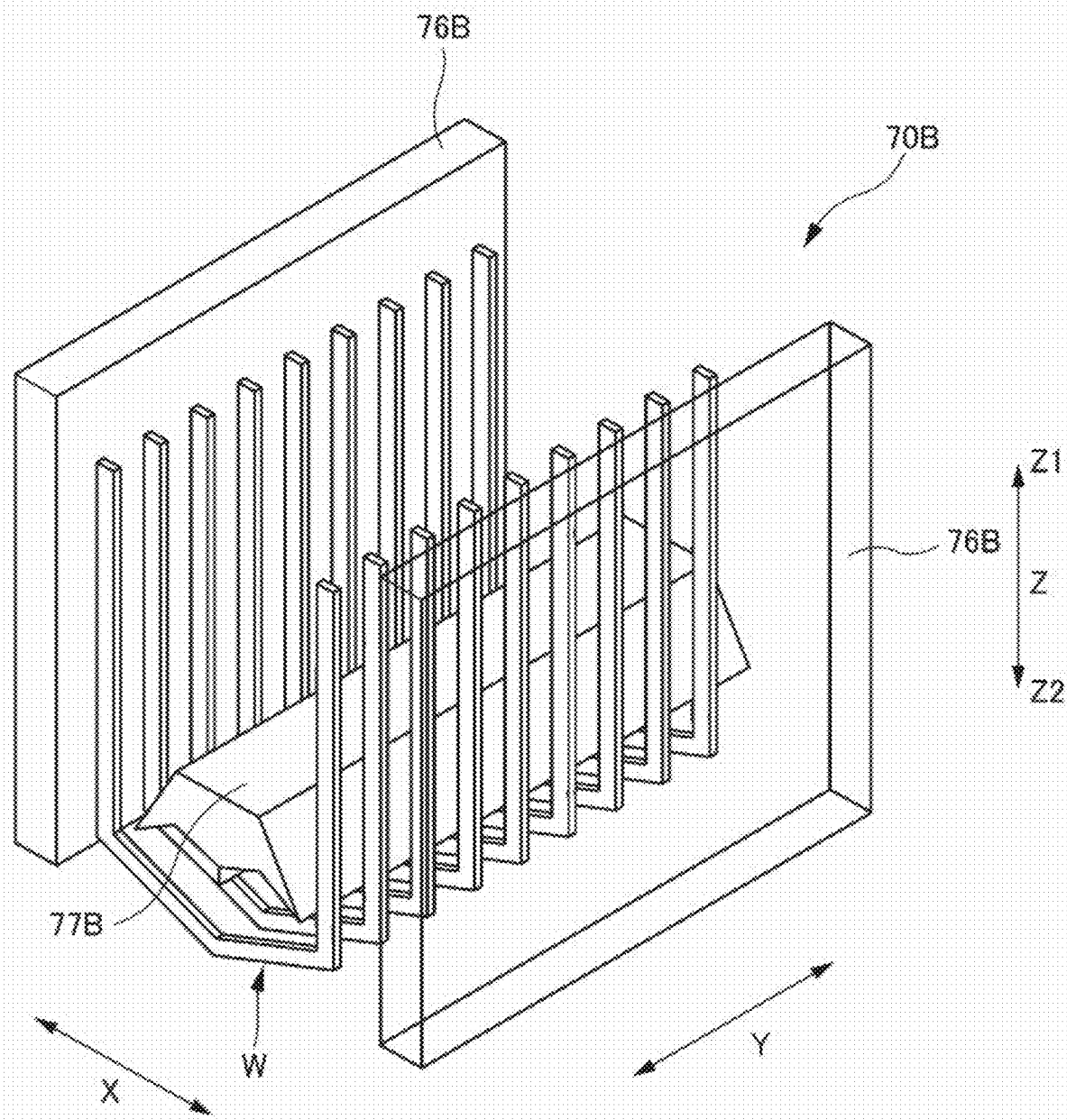
FIG. 7 is a perspective view illustrating a method for manufacturing a coil according to a second embodiment.
Figure 8:
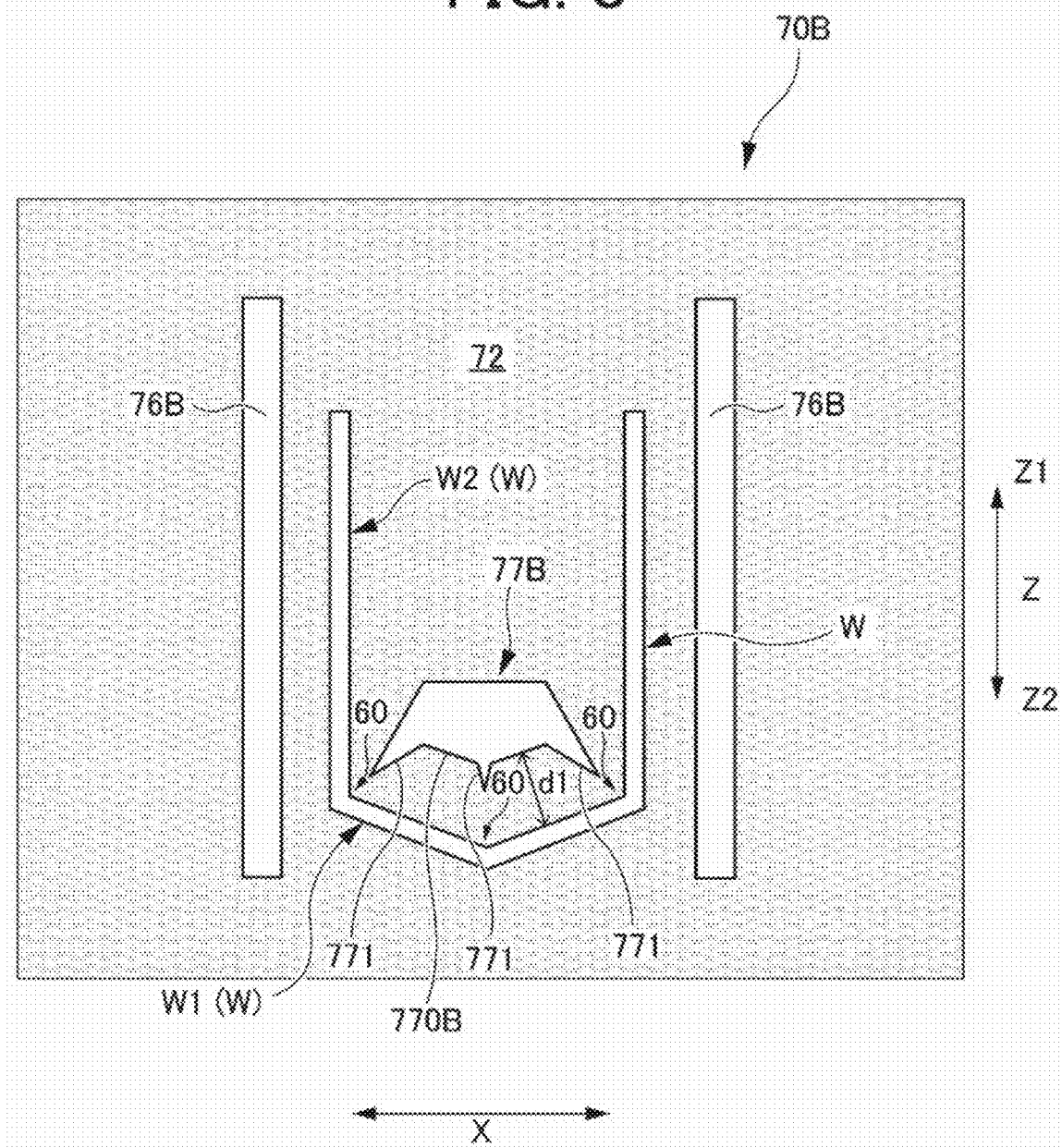
FIG. 8 is a front view illustrating the method for manufacturing a coil according to the second embodiment.

FIGS. 7 and 8 are illustrations of a method for manufacturing a coil according to a second embodiment. FIG. 7 is a perspective view schematically showing the workpieces W immersed in an electrodeposition bath 70B, and FIG. 8 is a front view schematically showing the workpieces W immersed in the electrodeposition bath 70B.

In the second embodiment, the second electrode 76 has electrodes 76B and a thick film applying electrode 77B.

The electrodes 76B may be similar to the electrodes 76A according to the first embodiment described above.

The thick film applying electrode 77B is disposed on the Z1 side in the Z direction of the thick film application portions W1. The thick film applying electrode 77B is disposed so as to overlap the thick film application portions W1 of the workpieces W as viewed in the Z direction. The thick film applying electrode 77B has an opposing surface 770B on the Z2 side at a position offset by a predetermined distance d1 from the thick film application portions W1 toward the Z1 side in the Z direction. The predetermined distance d1 may be a constant value. The side surfaces in the X direction of the thick film applying electrode 77B are tilted away from the thin film application portions W2 as they get closer to their edges on the Z1 side in the Z direction. In this case, the side surfaces in the X direction of the thick film applying electrode 77B will not be located at a distance smaller than the predetermined distance d1 from the thin film application portions W2.

In this case, in the electrodeposition coating step according to the second embodiment, the workpieces W are immersed in the electrodeposition bath 70B such that the thick film application portions W1 are located closer to the thick film applying electrode 77B than the thin film application portions W2.

According to the second embodiment, since the thick film applying electrode 77B is mounted at a position close to the thick film application portions the thickness of the insulating film 130 that is applied to the thick film application portions W1 can be increased. Specifically, electricity easily flows between the thick film applying electrode 77B and the thick film application portions W1, so that a coating film is easily deposited on the thick film application portions W1. As a result, a significantly thicker insulating film 130 can be applied to the thick film application portions W1 than to the thin film application portions W2.

The thick film applying electrode 77B preferably includes protruding portions 771 protruding toward the Z2 side in the Z direction from the opposing surface 770B. The protruding portions 771 are preferably in the form having a pointed top. The tips of the protruding portions 771 are located close to the deepest positions of recess portions 60 of the thick film application portions W1 (at a distance significantly smaller than the predetermined distance d1). In the present embodiment, each thick film application portion W1 corresponds to the form of the crossover portion 54, and has three recess portions 60. The three recess portions 60 consist of two recess portions 60 due to bending between the crossover portion 54 and the coil piece 52 and a recess portion 60 in the middle in the circumferential direction of the crossover portion 54. The protruding portions 771 are provided at three positions corresponding to the three recess portions 60.

In this case, the electrodeposition coating step according to the second embodiment implements the immersion state of FIG. 8 by immersing the workpieces W in the electrodeposition bath 70B such that the protruding portions 771 of the thick film applying electrode 77B are located close to the recess portions 60.

There is a tendency for a coating film to be less likely to be deposited on the recess portions 60 of the workpieces W. Since the recess portions 60 are formed by bending, recess portions like the recess portions 60 tend to be formed in the crossover portion 54. That is, the workpieces W made of the formed coil material tend to have recess portions on which a coating film is less likely to be deposited, like the recess portions 60. When the thick film application portions W1 include such curved or angled portions, a desired film thickness may not be obtained on the thick film application portions W1.

In this respect, according to the second embodiment, the protruding portions 771 of the thick film applying electrode 77B are located close to the recess portions 60 as described above. Therefore, the tendency for the insulating film 130 to be locally relatively thin on the recess portions 60 of the thick film application portions W can be reduced, and the thickness of the insulating film 130 that is applied to the recess portions 60 can be effectively increased. Since the protruding portions 771 have a sharp form, electric charge tends to concentrate current density tends to be high) on the recess portions 60. The thickness of the insulating film 130 that is applied to the recess portions 60 can therefore be effectively increased.

As described above, according to the second embodiment, the thick film applying electrode 77B is used in addition to the electrodes 76B to make it easier for a coating film to be deposited locally on a part of each workpiece W, namely the thick film application portions W1. Therefore, the insulating film 130 can be simultaneously applied with different thicknesses to the thick film application portions W1 and the thin film application portions W2. Therefore, according to the second embodiment, the difference in thickness of the insulating film 130 between the thick film application portion W1 and the thin film application portion W2 can be efficiently obtained. That is, according to the second embodiment, the insulating film 130 whose thickness is significantly different depending on the part of the coil piece 52 can be efficiently applied by electrodeposition coating.

Third Embodiment

Figure 9:
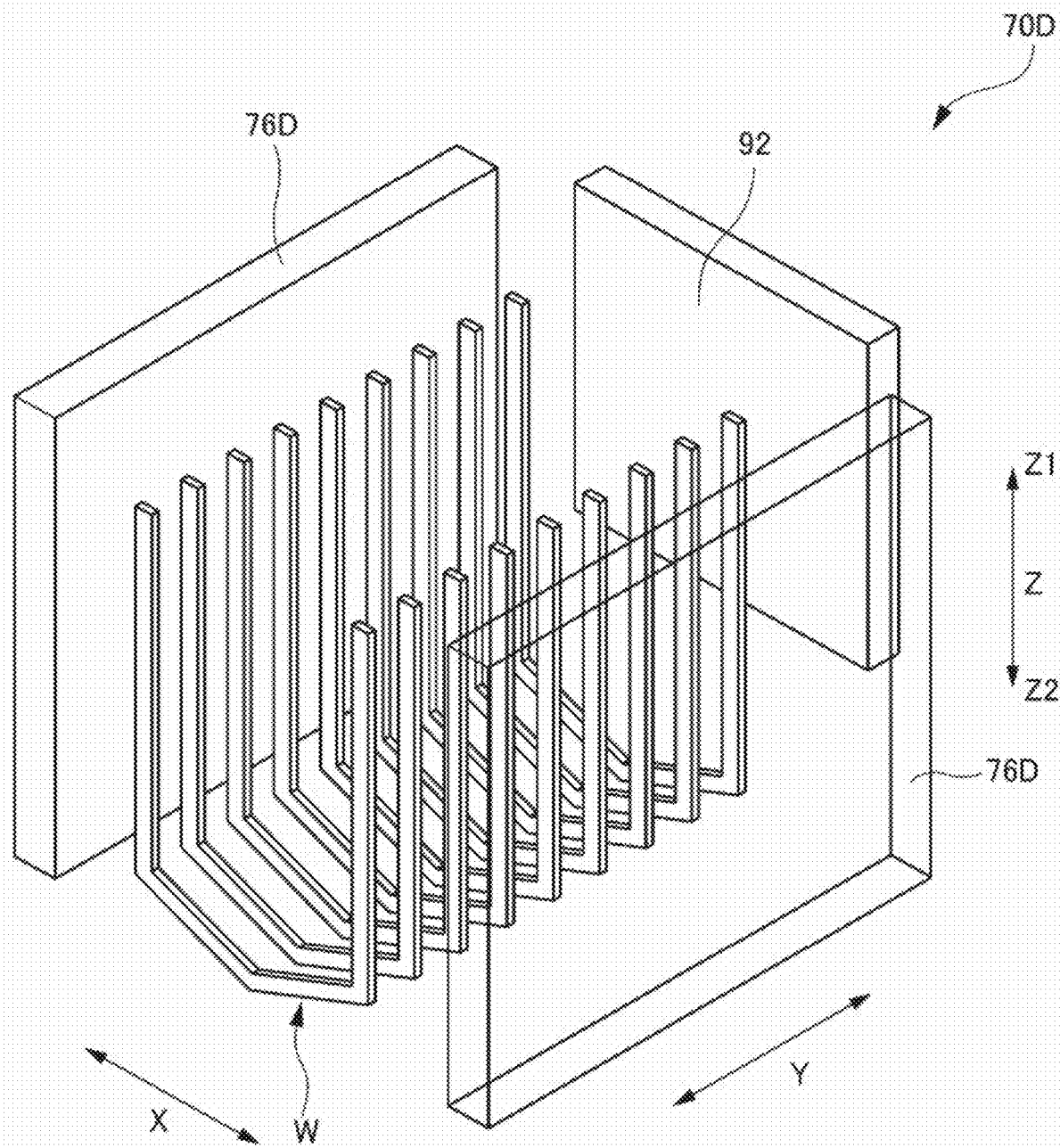
FIG. 9 is a perspective view illustrating a method for manufacturing a coil according to a third embodiment.

FIGS. 9 and 10 are illustrations of a method for manufacturing a coil according to a third embodiment, FIG. 9 is a perspective view schematically showing the workpieces W immersed in an electrodeposition bath 70D, and FIG. 10 is a front view schematically showing the workpieces W immersed in the electrodeposition bath 70D. A flow velocity reducing member 92 shown in FIG. 9 is not shown in FIG. 10. FIG. 11A is a diagram schematically showing the flow of paint around the workpiece W immersed in the electrodeposition bath 70D as viewed in the Y direction. In FIG. HA, the flow of the paint is schematically shown by arrows 8100 to 8102. FIG. 11B is a diagram showing the relationship between the flow velocity of the paint and the film thickness. The abscissa represents the flow velocity, the ordinate represents the film thickness, and the relationship therebetween is shown by plotted points (plotted points having a range in the vertical direction). It is herein assumed that the paint is caused to flow in the Y direction.

In the third embodiment, the second electrode 76 has electrodes 76D, and the electrodeposition bath 70D further has the flow velocity reducing member 92.

The electrodes 76D are disposed on both sides in the X direction of the workpieces W so as to face, in the X direction, the thin film application portions W2 for the slot-housed portions 50 on both sides in the X direction. Each electrode 76D is disposed so as to cover the workpieces W along their entire length in the Z direction as viewed in the X direction.

The flow velocity reducing member 92 is a member that is not permeable to liquid (paint), and resists the flow of the paint in the electrodeposition bath 70D. The flow velocity reducing member 92 is, for example, in the form of a plate, and is disposed such that the direction normal to its surface matches the flow direction of the paint (Y direction) in order for the flow velocity reducing member 92 to provide a significant resistance to the flow of the paint in the flow direction. The flow velocity reducing member 92 has a significantly higher electrical resistance than the electrodes 76D. The flow velocity reducing member 92 is formed by, for example, coating an SUS plate etc. with epoxy resin etc. The flow velocity reducing member 92 is disposed so as to cover a part of the workpiece W, namely the thin film application portions W2 along their entire length in the Z direction, as viewed in the Y direction. Therefore, the flow velocity reducing member 92 does not cover the thick film application portion W1 as viewed in the Y direction.

In this case, the electrodeposition coating step according to the third embodiment includes immersing the workpieces W in the electrodeposition bath 70D such that the flow velocity of the paint around the thin film application portions W2 is lower than that of the paint around the thick film application portions as shown in FIGS. 9 to 11A. As schematically shown in FIG. 11A, when the flow velocity reducing member 92 is disposed such that the direction normal to its surface matches the flow direction of the paint see arrow R100), the flow is blocked around the flow velocity reducing member 92 (see arrows R100'), so that the flow velocity on the back side (downstream side in the flow direction) of the flow velocity reducing member 92 is significantly reduced (see arrows R102). The flow velocity of the paint around the thin film application portions W2 located on the back side (downstream side in the flow direction) of the flow velocity reducing member 92 is therefore significantly reduced.

As shown in FIG. 11B, the relationship between the flow velocity of the paint and the film thickness has a tendency that the film thickness decreases significantly when the flow velocity becomes relatively low. Therefore, according to the third embodiment, a relatively thin insulating film 130 can be applied to the thin film application portions W2. On the other hand, the flow of the paint around the thick film application portions W1 is not significantly affected by the flow velocity reducing member 92 (see arrows R101). As a result, a significantly thicker insulating film 130 can be applied to the thick film application portions W1 than to the thin film application portions W2.

As described above, according to the third embodiment, the flow velocity reducing member 92 is used to control the flow velocity of the paint to make it more difficult for a coating film to be deposited locally on a part of each workpiece W, namely the thin film application portions W2. Therefore, the insulating film 130 can be simultaneously applied with different thicknesses to the thick film application portions W and the thin film application portions W2. Therefore, according to the third embodiment, the difference in thickness of the insulating film 130 between the thick film application portion W1 and the thin film application portion W2 can be efficiently obtained. That is, according to the third embodiment, the insulating film 130 whose thickness is significantly different depending on the part of the coil piece 52 can be efficiently applied by electrodeposition coating.

Fourth Embodiment

Figure 12:
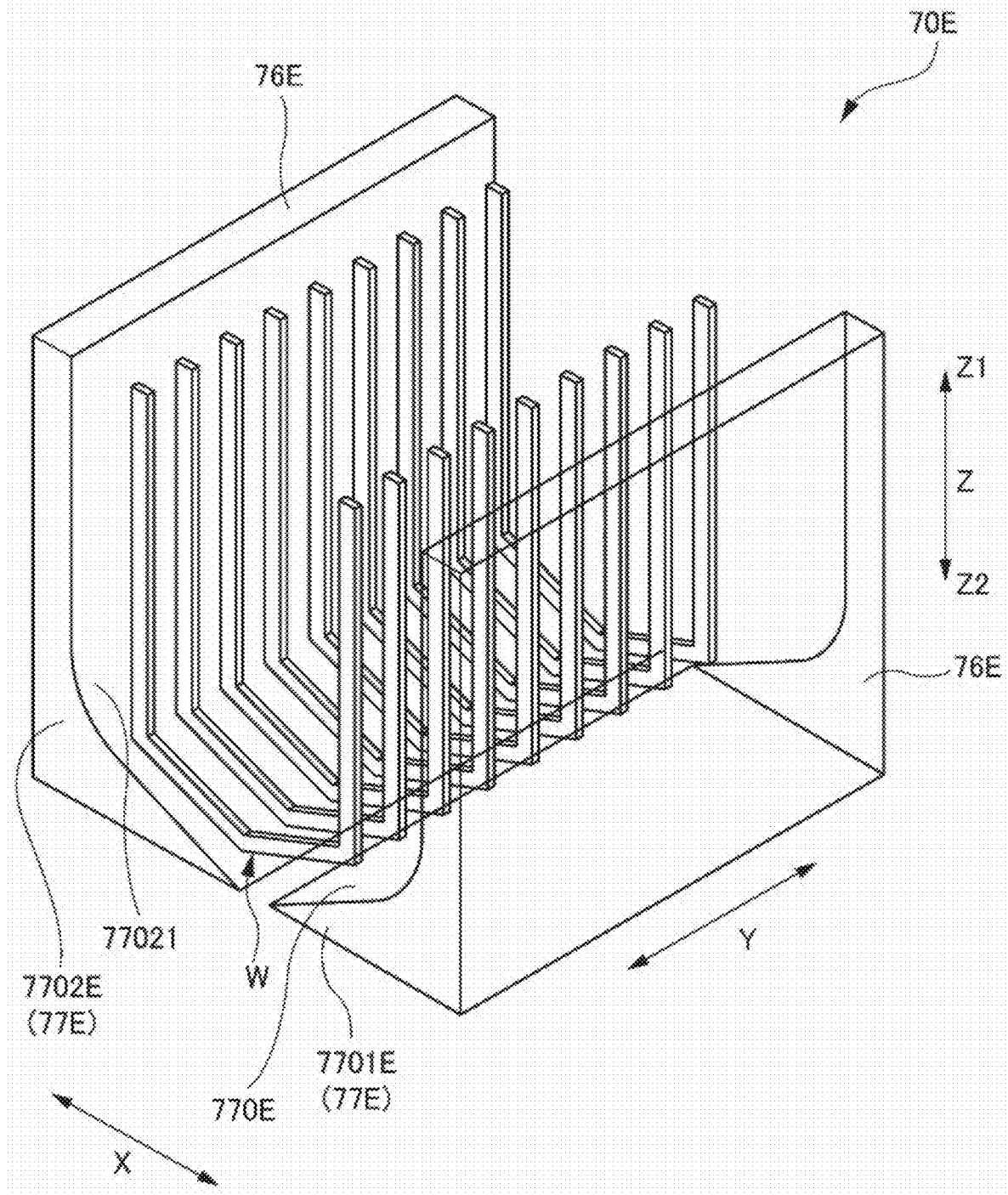
FIG. 12 is a perspective view illustrating a method for manufacturing a coil according to a fourth embodiment.
Figure 13:
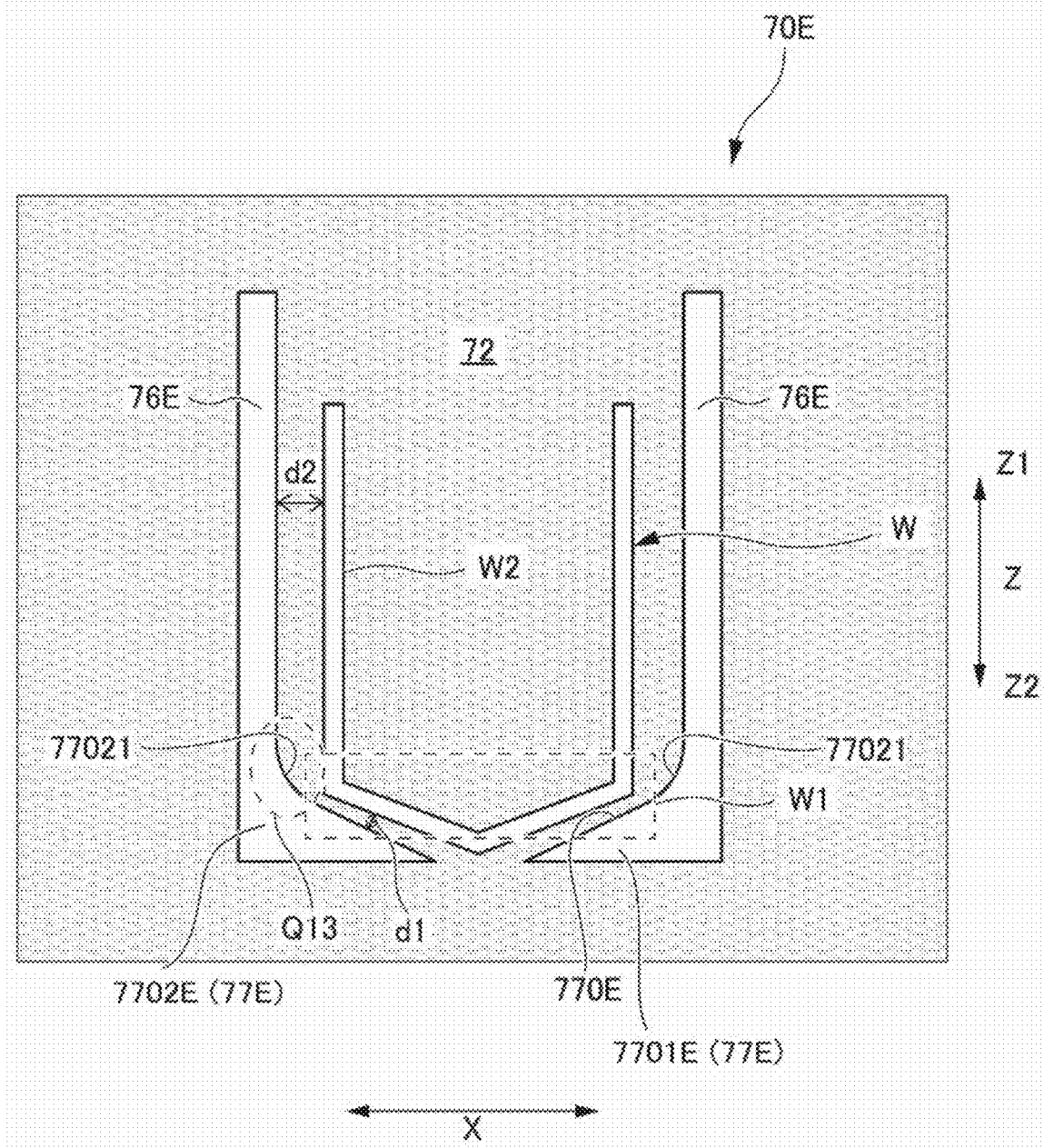
FIG. 13 is a front view illustrating the method for manufacturing a coil according to the fourth embodiment.
Figure 14:
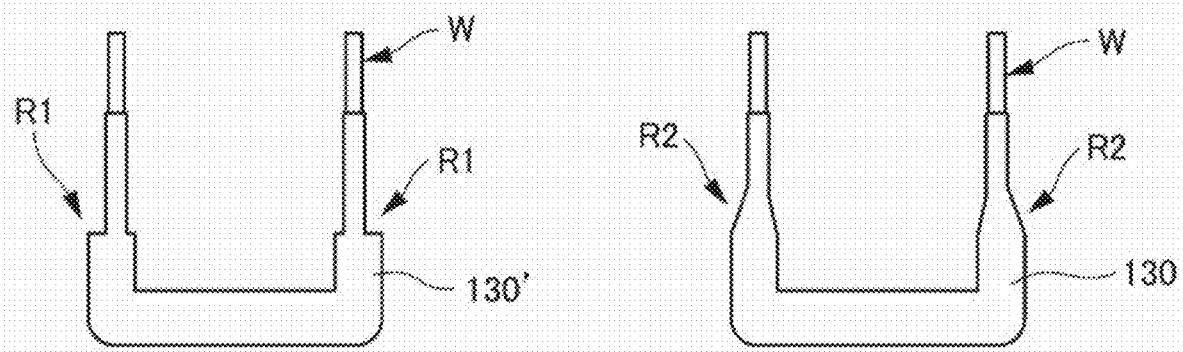
FIG. 14 is an illustration of effects as seen from comparison with a comparative example.
Figure 15:
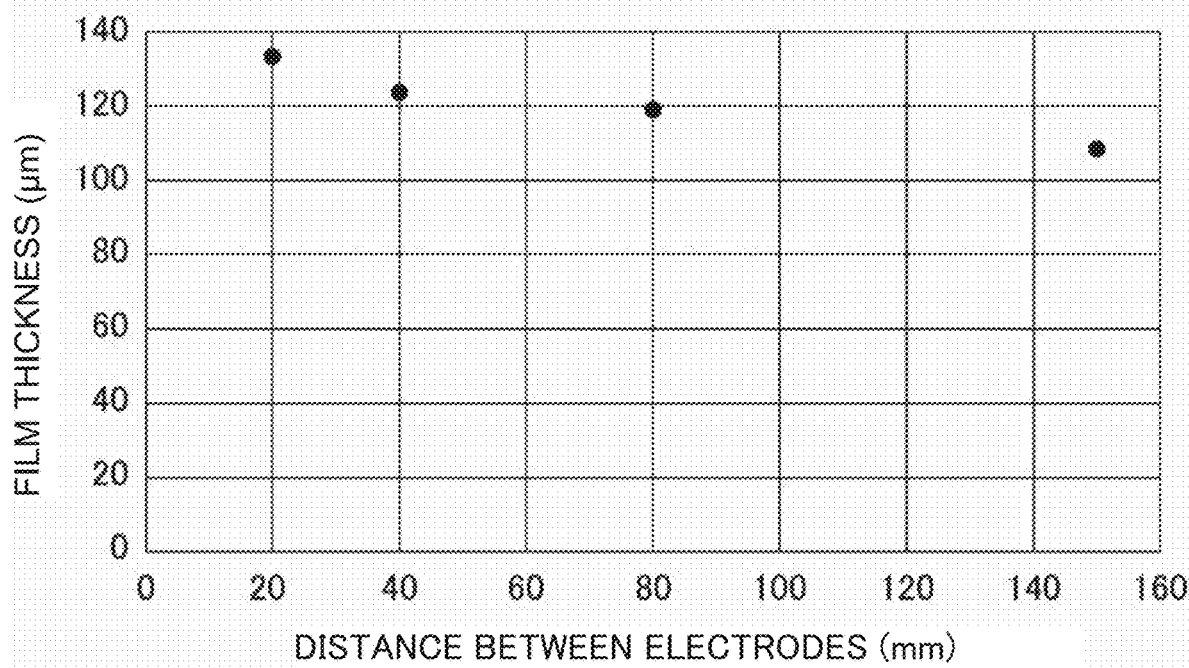
FIG. 15 is a diagram showing the relationship between the distance between electrodes and the film thickness.

FIGS. 12 and 13 are illustrations of a method for manufacturing a coil according to a fourth embodiment. FIG. 12 is a perspective view schematically showing the workpieces W immersed in an electrodeposition bath 70E, and FIG. 13 is a front view schematically showing the workpieces W immersed in the electrodeposition bath 70E. FIG. 14 is a diagram schematically showing a comparison between an insulating film 130' according to a comparative example and the insulating film 130 formed according to the third embodiment. FIG. 15 is a diagram showing the relationship between the distance between electrodes and the film thickness. The abscissa represents the distance between electrodes, the ordinate represents the film thickness, and the relationship therebetween is shown by plotted points.

In the fourth embodiment, the second electrode 76 has electrodes 76E and thick film applying electrodes 77E.

The electrodes 76E extend on both sides in the X direction of the workpieces W so as to face, in the X direction, the thin film application portions W2 for the slot-housed portions 50 on both sides in the X direction. Each electrode 76E is continuously connected to the thick film applying electrode 77E. In the illustrated example, each electrode 76E is integral with the thick film applying electrode 77E. However, these electrodes may be separate electrodes. A part of each electrode 76E that is provided around the thin film application portions W2 may be similar to the electrode 76A according to the first embodiment described above. In the illustrated example, the part of each electrode 76E that is provided around the thin film application portions W2 is disposed at a position offset by a predetermined distance d2 in the X direction from the thin film application portions W2.

Each thick film applying electrode 77E includes a first portion 7701E and a second portion 7702E.

The first portions 7701E are disposed on the Z2 side in the Z direction of the thick film application portions W1. The first portions 7701E are disposed so as to overlap the thick film application portions W1 of the workpieces W as viewed in the Z direction. Each first portion 7701E has an opposing surface 770E on the Z1 side at a position offset by a predetermined distance d1 from the thick film application portions W1 toward the Z2 side in the Z direction.

Each second portion 7702E extends between the electrode 76E and the first portion 7701E. The second portions 7702E are disposed on both sides in the X direction with respect to the thick film application portions W1, and are continuous to the lower ends of the electrodes 76E. Each electrode 76E may be formed such that the Z2 side in the Z direction of its lower end portion gradually becomes closer to the workpieces W. That is, the boundary between the electrode 76E and the second portion 7702E need not necessarily be clear.

As described above, in the fourth embodiment, the electrodes 76E and the thick film applying electrodes 77E cooperate to form integral electrodes around an immersion portion where the workpieces W are immersed.

In the fourth embodiment, the electrodeposition coating step includes immersing the workpieces w in the electrodeposition bath 70E such that the thick film application portions W1 are separated from the thick film applying electrodes 77E by the predetermined distance d1 (example of the first distance) and the thin film application portions W2 are separated from the electrodes 76E by the predetermined distance d2 (example of the second distance).

In this case, the predetermined distance d1 and the predetermined distance d2 correspond to the distance between electrodes. Therefore, the thickness of the insulating film 130 that is applied to the thick film application portions W1 and the thin film application portions W2 varies according to the values of the distances d1, d2 Specifically, as shown in FIG. 15, the film thickness tends to increase as the distance between electrodes decreases.

In the fourth embodiment, such characteristics are used, and therefore the predetermined distance d1 is significantly smaller than the predetermined distance d2. A significantly thicker insulating film 130 can thus be applied to the thick film application portions W1 than to the thin film application portions W2.

The insulating film 130' according to the comparative example schematically shown in FIG. 14 is significantly thicker on the thick film application portion W1 than on the thin film application portion W2, but has a step at the position where the thickness suddenly changes (see arrow R1). Such a step tends to be caught by the stator core 112 when mounting the coil pieces 52 into the slots 23, which may contribute to reducing the ease of assembly.

Therefore, in the fourth embodiment, the second portions 7702E are configured not to form such a step. Specifically, as shown by a portion Q13 in FIG. 13, each second portion 7702E has a tilted surface 77021 that is gradually separated away from the workpieces W toward the Z1 side in the Z direction. As shown in FIG. 13, each tilted surface 77021 may be a curved surface that is curved toward the Z2 side in the Z direction. The distance between the thick film applying electrode 77E and the workpieces W (i.e., the distance between electrodes) gradually increases toward the Z1 side in the Z direction (i.e., from the thick film application portion W1 toward the thin film application portion W2). As a result, such a film thickness profile that the film thickness gradually decreases from the thick film application portion W1 toward the thin film application portion W2 like the insulating film 130 schematically shown in FIG. 14 can be implemented (see arrows R2). In this case, the step in the insulating film 130' according to the comparative example can be eliminated, and satisfactory ease of assembly can be implemented.

As described above, according to the fourth embodiment, a change in distance between the electrode 76E and thick film applying electrode 77E and the workpiece W is used to make it more difficult for a coating film to be deposited locally on a part of each workpiece W, namely the thin film application portions W2. Therefore, the insulating film 130 can be simultaneously applied with different thicknesses to the thick film application portions W1 and the thin film application portions W2. Therefore, according to the fourth embodiment, the difference in thickness of the insulating film 130 between the thick film application portion W1 and the thin film application portion W2 can be efficiently obtained. That is, according to the fourth embodiment, the insulating film 130 whose thickness is significantly different depending on the part of the coil piece 52 can be efficiently applied by electrodeposition coating.

Fifth Embodiment

Figure 16:
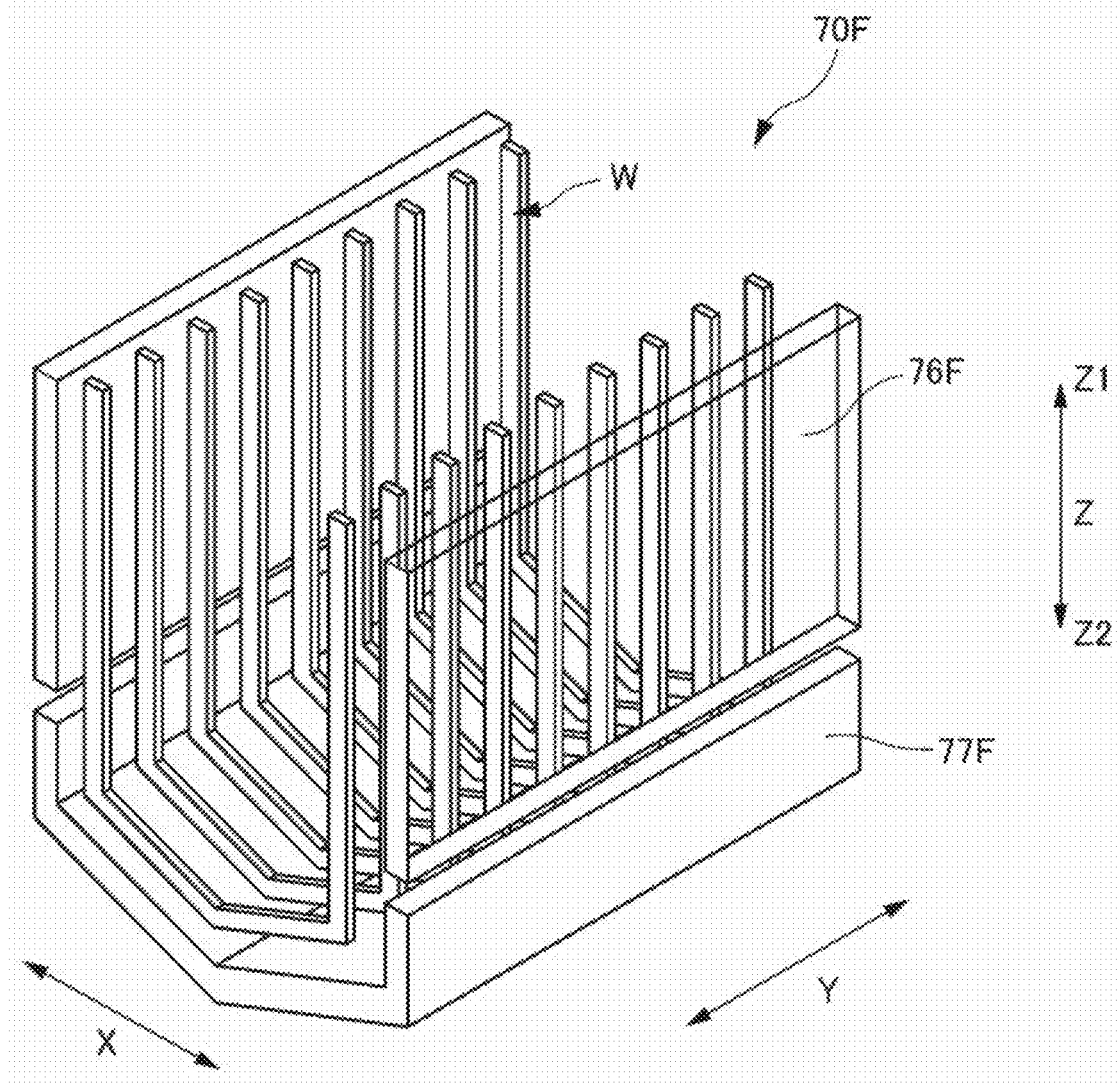
FIG. 16 is a perspective view illustrating a method for manufacturing a coil according to a fifth embodiment.
Figure 17:
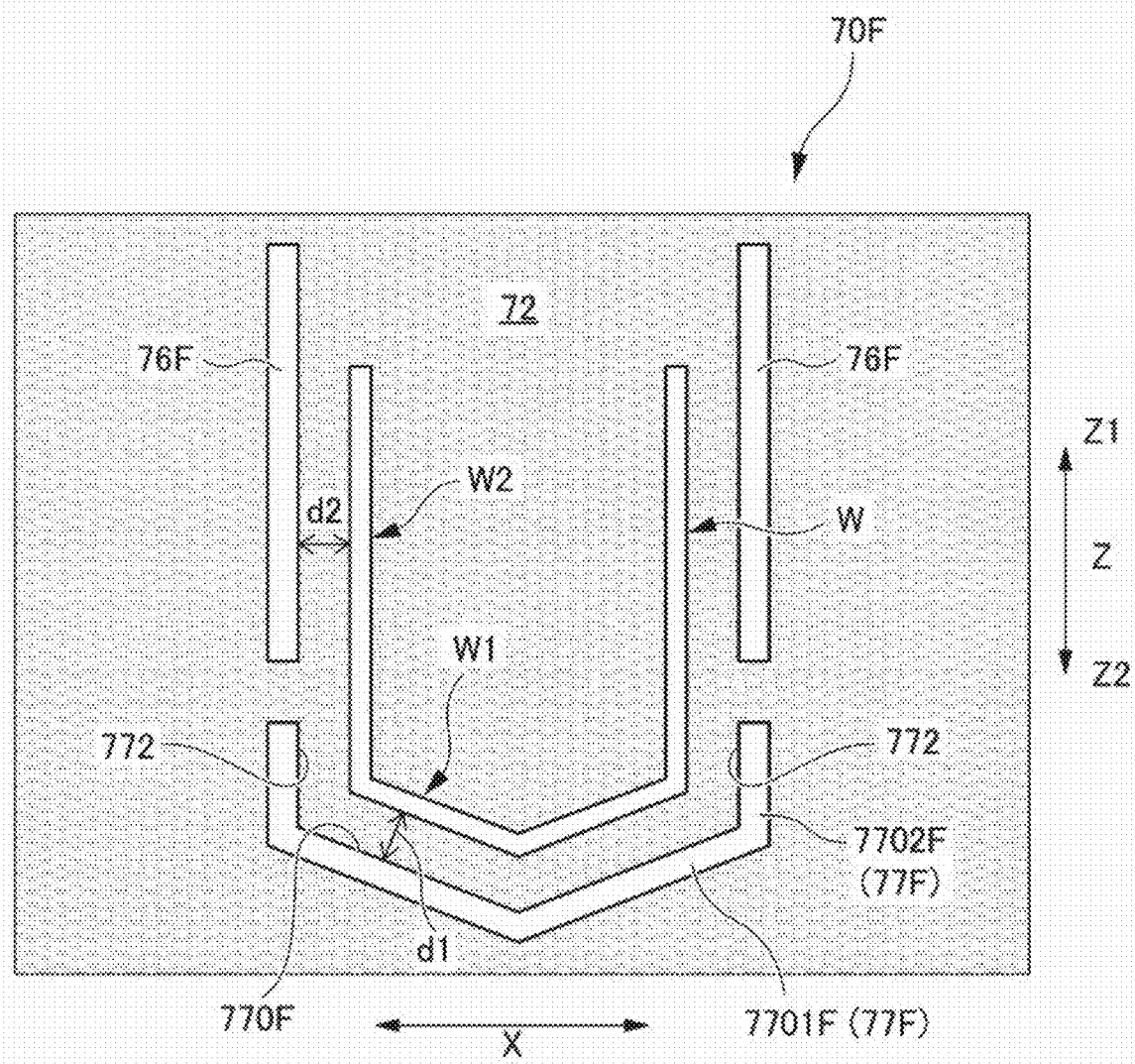
FIG. 17 is a front view illustrating the method for manufacturing a coil according to the fifth embodiment.

FIGS. 16 and 17 are illustrations of a method for manufacturing a coil according to a fifth embodiment. FIG. 16 is a perspective view schematically showing the workpieces W immersed in an electrodeposition bath 70F, and FIG. 17 is a front view schematically showing the workpieces W immersed in the electrodeposition bath 70F. FIG. 18 is a diagram showing the relationship between the applied voltage and the film thickness. The abscissa represents the applied voltage, the ordinate represents the film thickness, and the relationship therebetween is shown by plotted points.

In the fifth embodiment, the second electrode 76 has thin film applying electrodes 76F and a thick film applying electrode 77F. The thin film applying electrodes 76F and the thick film applying electrode 77F are separated from each other and are not electrically connected to each other.

The thin film applying electrodes 76F are provided around the thin film application portions W2. The thin film applying electrodes 76F are disposed on both sides in the X direction of the workpieces W. Each thin film applying electrode 76F is disposed so as to cover the thin film application portions 11'2 of the workpieces W along their entire length in the Z direction as viewed in the X direction. Each thin film applying electrode 76F is disposed at a position offset by a constant predetermined distance d2 in the X direction from the thin film application portions W2. In a modification, the thin film applying electrodes 76F may be disposed on both sides in the Y direction of the workpieces W. In this case as well, each thin film applying electrode 76F may be disposed so as to cover the thin film application portion W2 along its entire length in the Z direction as viewed in the Y direction.

The thick film applying electrode 77F is provided around the thick film application portions W1. The thick film applying electrode 77F has a first portion 7701F that is disposed on the Z2 side in the Z direction with respect to the thick film application portions W1, and second portions 7702F that are disposed on both sides in the X direction of the workpieces W.

The first portion 7701F has an opposing surface 770F on the Z1 side at a position offset by a predetermined distance d1 from the thick film application portions W1 toward the Z2 side in the Z direction. The second portions 7702F have opposing surfaces 772 on both sides in the X direction at positions offset by the predetermined distance d1 in the X direction from the thick film application portions W1. The predetermined distance d1 may be constant and may be the same as the predetermined distance d2. However, in a modification, as in the fourth embodiment, the predetermined distance d1 for the first portion 7701E may be smaller than the predetermined distance d2, and may gradually get closer to the same value as the predetermined distance d2 toward the Z1 side in the Z direction.

In the fifth embodiment, different voltages are applied to the thin film applying electrodes 76F and the thick film applying electrode 77F. Specifically, the voltage that is applied to the thick film applying electrode 77F is higher than the voltage that is applied to the thin film applying electrodes 76F. In this case, the potential difference between the thick film application portions W1 and the thick film applying electrode 77F is larger than that between the thin film application portions W2 and each thin film applying electrode 76F. When the predetermined distances d1, d2 are the same, the film thickness that is obtained by electrodeposition coating tends to increase as the applied voltage increases, as shown in FIG. 18. Therefore, according to the fifth embodiment, a significantly thicker insulating film 130 can be applied to the thick film application portions W1 than to the thin film application portions W2.

As described above, according to the fifth embodiment, the difference in potential difference generated between the thin film applying electrode 76F and thick film applying electrode 77F and the workpiece W is used to make it more difficult for a coating film to be deposited locally on a part of each workpiece W, namely the thin film application portions W2. Therefore, the insulating film 130 can be simultaneously applied with different thicknesses to the thick film application portions W1 and the thin film application portions W2. Therefore, according to the fifth embodiment, the difference in thickness of the insulating film 130 between the thick film application portion W1 and the thin film application portion W2 can be efficiently obtained. That is, according to the fifth embodiment, the insulating film 130 whose thickness is significantly different depending on the part of the coil piece 52 can be efficiently applied by electrodeposition coating.

Sixth Embodiment

FIG. 19 is an illustration of a method for manufacturing a coil according to a sixth embodiment, and is a perspective view schematically showing the workpieces W immersed in an electrodeposition bath 70G.

In the sixth embodiment, the second electrode 76 has electrodes 76G.

Each electrode 76G has thin film applying electrode portions 761G and a thick film applying electrode portion 771G. In FIG. 19, the thin film applying electrode portions 761G and the thick film applying electrode portion 771G are integral, but may not be electrically connected to each other.

As shown in FIG. 19, the thin film applying electrode portions 761G are disposed on both sides in the X direction of the workpieces W so as to face the thin film application portions W2 in the X direction. Each thin film applying electrode portion 7616 is disposed so as to cover the thin film application portion W2 of the workpiece W along its entire length in the Z direction as viewed in the X direction. Each thin film applying electrode portion 761G is disposed at a position offset by a constant predetermined distance d2 (not shown, see FIG. 17 etc.) in the X direction from the thin film application portion W2. In a modification, the thin film applying electrode portions 761G may be disposed on both sides in the Y direction of the workpieces W. In this case as well, each thin film applying electrode portion 761G may be disposed so as to cover the thin film application portion W2 along its entire length in the Z direction as viewed in the Y direction.

The thick film applying electrode portion 771G extends in the Z direction continuously from the lower end portions of the thin film applying electrode portions 761G toward the Z2 side in the Z direction. The thick film applying electrode portion 771G is disposed so as to cover the thick film application portions W1 of the workpieces W along their entire length in the Z direction as viewed in the X direction. The thick film applying electrode portion 771G may be disposed at a position offset by a distance larger than the above predetermined distance d2 in the X direction from the thick film application portions W1. In a modification, the thick film applying electrode portion 771G may be in a form similar to that of the thick film applying electrode 77E according to the fourth embodiment described above, or may be in a form similar to that of the thick film applying electrode 77F according to the fifth embodiment described above.

In the sixth embodiment, the thin film applying electrode portions 761G have a smaller width in the Y direction than the thick film applying electrode portion 771G. In FIG. 19, the thick film applying electrode portion 771G is formed continuously in the Y direction for the plurality of workpieces W arranged in the Y direction, whereas the thin film applying electrode portions 761G are formed like comb teeth such that they are separated from each other and face each workpiece W. Therefore, the area of a part of each thin film applying electrode portion 761G that faces the workpiece W in the X direction is significantly smaller than the area of a part of the thick film applying electrode portion 771G that faces the workpieces W in the X direction.

According to the electrodeposition coating step of the sixth embodiment, the area of the electrode facing the thin film application portion W2 (the area of the side surface in the Y direction of the thin film applying electrode portion 761G) can be made relatively small. As the area of the electrode facing the thin film application portion W2 decreases, it becomes more difficult for electricity to flow around the thin film application portion W2 (current density decreases), making it more difficult for a coating film to be deposited thereon. On the other hand, since the area of the electrode facing the thick film application portions W1 (area of the side surface in the Y direction of the thick film applying electrode portion 771G) remains relatively large, electricity easily flows around the thick film application portions W1, and the coating film is easily deposited thereon. As a result, a significantly thicker insulating film 130 can be applied to the thick film application portions W1 than to the thin film application portions W2.

As described above, according to the sixth embodiment, the difference in area between the electrodes facing the workpieces W is used to make it more difficult for a coating film to be deposited locally on a part of each workpiece W, namely the thin film application portions W2. Therefore, the insulating film 130 can be simultaneously applied with different thicknesses to the thick film application portions W1 and the thin film application portions W2. Therefore, according to the sixth embodiment, the difference in thickness of the insulating film 130 between the thick film application portion W1 and the thin film application portion W2 can be efficiently obtained. That is, according to the sixth embodiment, the insulating film 130 whose thickness is significantly different depending on the part of the coil piece 52 can be efficiently applied by electrodeposition coating.

While the embodiments are described in detail above, the present disclosure is not limited to specific embodiments, and various modifications and changes can be made within the scope of the claims. It is also possible to combine all or some of the constituent elements of the embodiments described above. Of the effects of each embodiment, those related to dependent claims are additional effects distinguished from generic concepts (independent claim).

For example, in the case of the combination of the first embodiment and the third embodiment out of various combinations of the embodiments described above, the shielding members 90 may also serve as the flow velocity reducing member 92. Also, for example, in the case of the combination of the first embodiment with either the second embodiment or the fifth embodiment out of various combinations of the embodiments described above, the shielding member 90 that is located between the thin film application portions W2 and the electrode 76A as illustrated by FIG. 6 can also be located between the thin film application portions W2 and the electrode 76B as illustrated by FIG. 8 or between the thin film application portion W2 and the thin film applying electrodes 76F as illustrated by FIG. 17. Furthermore, the protruding portions 771 as illustrated by FIG. 8 can also be located close to the deepest positions of recess portions of the thick film application portions W1 in FIG. 17.

DESCRIPTION OF THE REFERENCE NUMERALS

130: insulating film, 114: stator coil (coil), W: workpiece (coil material), 70 (70A to 70G): electrodeposition bath, 74: first electrode, 76: second electrode, 90: shielding member, 771: protruding portion, 92: flow velocity reducing member, d1: predetermined distance (first distance), d2: predetermined distance (second distance)

The invention claimed is:

1. A method for manufacturing a coil with an insulating film, comprising:
    a preparation step of preparing a formed coil material to which the insulating film has not yet been applied; and
    an electrodeposition coating step of generating, with the coil material immersed in an electrodeposition bath, a potential difference between a first electrode connected to the coil material and a second electrode in the electrodeposition bath, wherein
    in the electrodeposition coating step, the insulating film is simultaneously applied to a portion of the coil material and another portion of the coil material in such a manner that a film thickness on the portion is thicker than a film thickness on the other portion,
    the second electrode has thin film applying electrodes provided around the other portion and a thick film applying electrode that is spaced from the thin film applying electrodes and is provided around the portion and having a first portion that is disposed below the portion in a vertical direction, and second portions that are disposed on both sides in a horizontal direction of the coil material, and
    a voltage that is applied to the thick film applying electrode is higher than a voltage that is applied to the thin film applying electrodes.

2. The method for manufacturing a coil according to claim 1, wherein
    the electrodeposition bath includes a shielding member whose electrical resistance is significantly higher than electrical resistance of the second electrode, and
    the electrodeposition coating step includes immersing the coil material in the electrodeposition bath in such a manner that the shielding member is located between the other portion and the second electrode.

3. The method for manufacturing a coil according to claim 1, wherein
    the second electrode includes a protruding portion, and
    the electrodeposition coating step includes immersing the coil material in the electrodeposition bath in such a manner that the portion is located closer to the protruding portion than the other portion.

4. The method for manufacturing a coil according to claim 1, wherein
    the electrodeposition bath includes a flow velocity reducing member that resists flow of paint in the electrodeposition bath, and
    the electrodeposition coating step includes immersing the coil material in the electrodeposition bath in such a manner that a flow velocity of the paint around the other portion is lower than a flow velocity of the paint around the portion due to the flow velocity reducing member.

5. The method for manufacturing a coil according to claim 1, wherein
    the second electrode extends around an immersion portion where the coil material is immersed, and
    the electrodeposition coating step includes immersing the coil material in the electrodeposition bath in such a manner that the portion is separated from the second electrode by a first distance and the other portion is separated from the second electrode by a second distance larger than the first distance.

6. The method for manufacturing a coil according to claim 2, wherein
    the second electrode includes a protruding portion, and
    the electrodeposition coating step includes immersing the coil material in the electrodeposition bath in such a manner that the portion is located closer to the protruding portion than the other portion.

7. The method for manufacturing a coil according to claim 2, wherein
    the electrodeposition bath includes a flow velocity reducing member that resists flow of paint in the electrodeposition bath, and
    the electrodeposition coating step includes immersing the coil material in the electrodeposition bath in such a manner that a flow velocity of the paint around the other portion is lower than a flow velocity of the paint around the portion due to the flow velocity reducing member.

8. The method for manufacturing a coil according to claim 3, wherein
    the electrodeposition bath includes a flow velocity reducing member that resists flow of paint in the electrodeposition bath, and
    the electrodeposition coating step includes immersing the coil material in the electrodeposition bath in such a manner that a flow velocity of the paint around the other portion is lower than a flow velocity of the paint around the portion due to the flow velocity reducing member.

9. The method for manufacturing a coil according to claim 6, wherein
    the electrodeposition bath includes a flow velocity reducing member that resists flow of paint in the electrodeposition bath, and
    the electrodeposition coating step includes immersing the coil material in the electrodeposition bath in such a manner that a flow velocity of the paint around the other portion is lower than a flow velocity of the paint around the portion due to the flow velocity reducing member.

10. The method for manufacturing a coil according to claim 2, wherein
    the second electrode extends around an immersion portion where the coil material is immersed, and
    the electrodeposition coating step includes immersing the coil material in the electrodeposition bath in such a manner that the portion is separated from the second electrode by a first distance and the other portion is separated from the second electrode by a second distance larger than the first distance.

11. The method for manufacturing a coil according to claim 3, wherein
the second electrode extends around an immersion portion where the coil material is immersed, and
the electrodeposition coating step includes immersing the coil material in the electrodeposition bath in such a manner that the portion is separated from the second electrode by a first distance and the other portion is separated from the second electrode by a second distance larger than the first distance.

12. The method for manufacturing a coil according to claim 6, wherein
the second electrode extends around an immersion portion where the coil material is immersed, and
the electrodeposition coating step includes immersing the coil material in the electrodeposition bath in such a manner that the portion is separated from the second electrode by a first distance and the other portion is separated from the second electrode by a second distance larger than the first distance.

13. The method for manufacturing a coil according to claim 4, wherein
the second electrode extends around an immersion portion where the coil material is immersed, and
the electrodeposition coating step includes immersing the coil material in the electrodeposition bath in such a manner that the portion is separated from the second electrode by a first distance and the other portion is separated from the second electrode by a second distance larger than the first distance.

14. The method for manufacturing a coil according to claim 7, wherein
the second electrode extends around an immersion portion where the coil material is immersed, and
the electrodeposition coating step includes immersing the coil material in the electrodeposition bath in such a manner that the portion is separated from the second electrode by a first distance and the other portion is separated from the second electrode by a second distance larger than the first distance.

15. The method for manufacturing a coil according to claim 8, wherein
the second electrode extends around an immersion portion where the coil material is immersed, and
the electrodeposition coating step includes immersing the coil material in the electrodeposition bath in such a manner that the portion is separated from the second electrode by a first distance and the other portion is separated from the second electrode by a second distance larger than the first distance.

16. The method for manufacturing a coil according to claim 9, wherein
the second electrode extends around an immersion portion where the coil material is immersed, and
the electrodeposition coating step includes immersing the coil material in the electrodeposition bath in such a manner that the portion is separated from the second electrode by a first distance and the other portion is separated from the second electrode by a second distance larger than the first distance.

* * * * *